US012474321B2

(12) United States Patent
Ambroso et al.

(10) Patent No.: US 12,474,321 B2
(45) Date of Patent: Nov. 18, 2025

(54) NANOPORE PROTEIN CONJUGATES FOR DETECTION AND ANALYSIS OF ANALYTES

(71) Applicant: Roche Diagnostics Operations, Inc., Indianapolis, IN (US)

(72) Inventors: Mark R. Ambroso, San Diego, CA (US); Kapil M.S. Bajaj, Newark, CA (US); Timothy K. Craig, Campbell, CA (US)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 1295 days.

(21) Appl. No.: 16/990,602

(22) Filed: Aug. 11, 2020

(65) Prior Publication Data

US 2021/0033591 A1 Feb. 4, 2021

Related U.S. Application Data

(63) Continuation of application No. PCT/EP2019/053482, filed on Feb. 13, 2019.

(60) Provisional application No. 62/630,993, filed on Feb. 15, 2018.

(51) Int. Cl.
*G01N 33/487* (2006.01)
*C07K 14/31* (2006.01)
*G01N 33/543* (2006.01)

(52) U.S. Cl.
CPC ....... *G01N 33/48721* (2013.01); *C07K 14/31* (2013.01); *G01N 33/54306* (2013.01); *C07K 2319/40* (2013.01); *C07K 2319/60* (2013.01)

(58) Field of Classification Search
CPC ....... G01N 33/48721; G01N 33/54306; C07K 14/31; C07K 2319/40; C07K 2319/60
See application file for complete search history.

(56) References Cited

U.S. PATENT DOCUMENTS

2020/0216887 A1\* 7/2020 Craig .................. C12N 9/1247

FOREIGN PATENT DOCUMENTS

| WO | 2001/059453 | 8/2001 | |
|---|---|---|---|
| WO | WO-2009033743 A1 \* | 3/2009 | ............. C07K 16/18 |
| WO | 2017/042038 | 3/2017 | |
| WO | WO-2017050722 A1 \* | 3/2017 | ........... C07K 14/245 |
| WO | 2017/167811 | 10/2017 | |

OTHER PUBLICATIONS

Al Qaraghuli, Mohammed M et al. "Antibody-protein binding and conformational changes: identifying allosteric signalling pathways to engineer a better effector response." Scientific reports vol. 10,1 13696. Aug. 13, 2020, doi:10.1038/s41598-020-70680-0 (Year: 2020).\*
Rabia, Lilia A et al. "Understanding and overcoming trade-offs between antibody affinity, specificity, stability and solubility." Biochemical engineering journal vol. 137 (2018): 365-374. doi:10.1016/j.bej.2018.06.003 (Year: 2018).\*
Poosarla, Venkata Giridhar et al. "Computational de novo design of antibodies binding to a peptide with high affinity." Biotechnology and bioengineering vol. 114,6 (2017): 1331-1342. doi:10.1002/bit.26244 (Year: 2017).\*
Lloyd, C et al. "Modelling the human immune response: performance of a 1011 human antibody repertoire against a broad panel of therapeutically relevant antigens." Protein engineering, design & selection : PEDS vol. 22,3 (2009): 159-68. doi: 10.1093/protein/gzn058 (Year: 2009).\*
Khan, Tarique, and Dinakar M Salunke. "Adjustable locks and flexible keys: plasticity of epitope-paratope interactions in germline antibodies." Journal of immunology (Baltimore, Md. : 1950) vol. 192,11 (2014): 5398-405. doi:10.4049/jimmunol.1302143 (Year: 2014).\*
Goel, Manisha et al. "Plasticity within the antigen-combining site may manifest as molecular mimicry in the humoral immune response." Journal of immunology (Baltimore, Md. : 1950) vol. 173,12 (2004): 7358-67. doi: 10.4049/jimmunol.173.12.7358 (Year: 2004).\*
Edwards, Bryan M et al. "The remarkable flexibility of the human antibody repertoire; isolation of over one thousand different antibodies to a single protein, BLyS." Journal of molecular biology vol. 334,1 (2003): 103-18. doi:10.1016/j.jmb.2003.09.054 (Year: 2003).\*
Avinash, Kumar Thakur, et al., "Real-time measurement of protein-protein interactions at single-molecule resolution using a biological nanopre," Nature Biotechnology, vol. 37, No. 1, Dec. 10, 2018, pp. 96-101.
Rotem, Dvir, et al., "Protein Detection by Nanopores Equipped with Aptamers." Journal of the American Chemical Society, vol. 134, No. 5, Feb. 8, 2012, pp. 2781-2787.
Winters-Hilt, Stephen, "The [alpha]-Hemolysin nanpore transduction detector—single-molecule binding studies and immunological screening of antibodies and aptamers," BMC Bioinformatics, BioMed Central, London, GB, vol. 8, No. Suppl 7, Nov. 1, 2007, p. S9.

(Continued)

*Primary Examiner* — Gregory S Emch
*Assistant Examiner* — McKenzie A Dunn
(74) *Attorney, Agent, or Firm* — FisherBroyles, LLP; Jason M. Pass

(57) ABSTRACT

Provided are methods, compositions, and systems for the detection of a target analyte. Also provided are methods, compositions, and systems for determining the concentration one or more target analytes in fluid solution. The compositions include nanopore conjugates in which a nanopore protein monomer is joined to a capture tag. Tethered to the nanopore protein conjugate is an analyte ligand directed to a specific analyte. When a voltage is applied across a nanopore assembly including the nanopore conjugate, the nanopore captures the capture tag at a given capture rate. In the presence of the analyte to the analyte ligand, however, the capture rate of the capture tag changes, thus permitting detection of the analyte by the nanopore assembly. Further, based on the capture rate associated with binding between the analyte and the analyte ligand, the concentration of the analyte can be determined using association/dissociation kinetics.

15 Claims, 4 Drawing Sheets

Specification includes a Sequence Listing.

(56) References Cited

OTHER PUBLICATIONS

Avinash, Kumar Thakur, et al., "Real-time measurement of protein-protein interactions at single-molecule resolution using a biological nanopore," Nature Biotechnology, vol. 37, No. 1, Dec. 10, 2018, pp. 96-101.
International Search Report and Written Opinion for PCT/EP2019/053482, mailed Apr. 18, 2019.

* cited by examiner

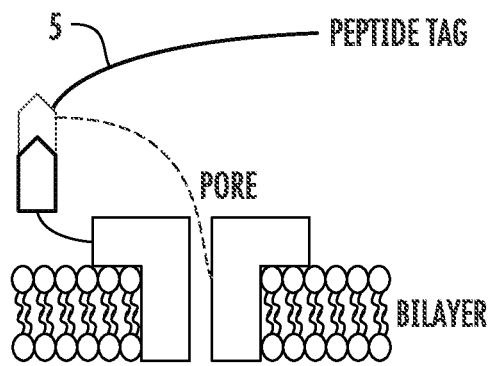
FIG. 4A BASELINE CAPTURE RATE
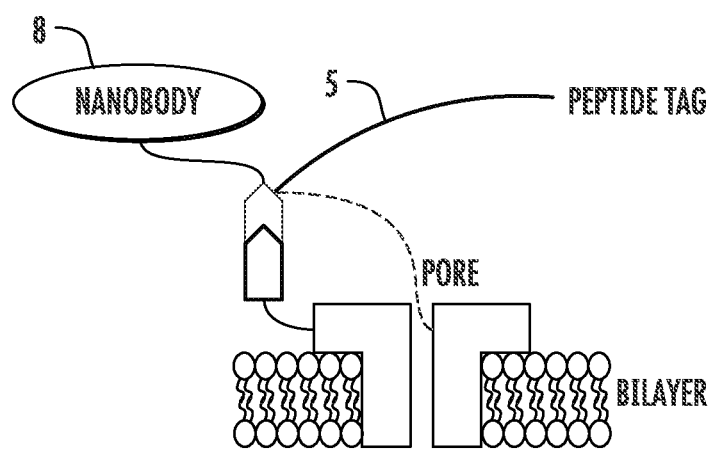
FIG. 4B FIRST CAPTURE RATE
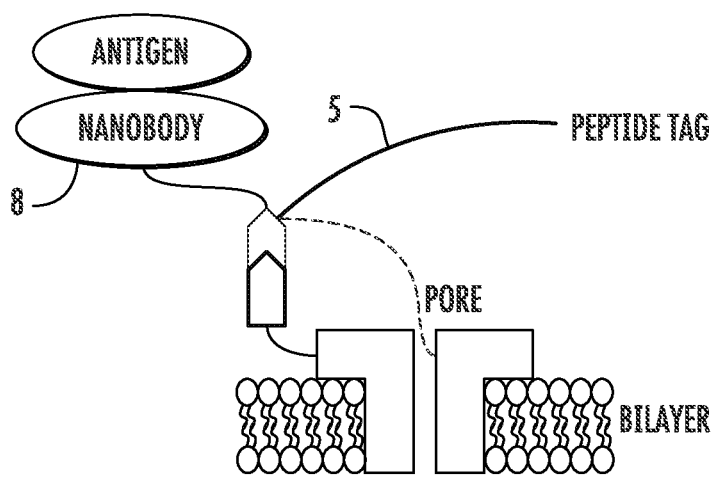
FIG. 4C SECOND CAPTURE RATE

NANOPORE PROTEIN CONJUGATES FOR DETECTION AND ANALYSIS OF ANALYTES

CROSS-REFERENCE TO RELATED APPLICATIONS

This application claims benefit of PCT/EP2019/053482, filed Feb. 13, 2019, claiming priority to U.S. Provisional Patent Application No. 62/630,993, filed Feb. 15, 2018, titled "NANOPORE PROTEIN CONJUGATES FOR DETECTION AND ANALYSIS OF ANALYTES." The entire disclosure of the above-identified priority application is hereby fully incorporated herein by reference in its entirety.

SEQUENCE LISTING

The instant application contains a Sequence Listing which has been submitted electronically in ASCII format and is hereby incorporated by reference in its entirety. Said ASCII copy, created on Aug. 11, 2020, is named 08485_001US1_SequenceListing.txt and is 29 KB in size.

TECHNICAL FIELD

The present disclosure relates generally to methods, compositions, and systems for the detection of a target analyte, and more particularly to the use of nanopore protein conjugates to identify an analyte in a fluid solution and to determine the concentration of the analyte in the solution.

BACKGROUND

Biologically active components, such as small molecules, proteins, antigens, immunoglobulins, and nucleic acids, are involved in numerous biological processes and functions. Hence, any disturbance in the level of such components can lead to disease or accelerate the disease process. For this reason, much effort has been expended in developing reliable methods to rapidly detect and identify biologically active components for use in patient diagnostics and treatment. For example, detecting a protein or small molecule in a blood or urine sample can be used to assess a patient's metabolic state. Similarly, detection of an antigen in a blood or urine sample can be used to identify pathogens to which a patient has been exposed, thus facilitating an appropriate treatment. And with the more recent advancements in identification of fetal cell-free DNA, the ability to prenatally diagnose certain genetic disorders from a mother's blood sample is now possible through detection of cell-free DNA. It is further beneficial to be able to determine the concentration of an analyte in solution. For example, determining the concentration of a blood or urine component can allow the component to be compared to a reference value, thus facilitating further evaluation of a patient's health status.

Nevertheless, while numerous detection and identification methods are available, many are expensive and can be rather time consuming. For example, many diagnostic tests can take several days to complete and require significant laboratory resources. And in some cases, diagnostic delays can negatively impact patient care, such as in the analysis of markers associated with myocardial infarction. Further, the complexity of many diagnostic tests aimed at identifying biologically active components lends itself to errors, thus reducing accuracy. And, many detection and identification methods can only analyze one or a few biological active components at a time (and cannot determine concentration).

What is needed are additional methods, compositions, and systems that can rapidly detect and identify biologically active components, especially in an efficient and cost-effect manner. Also needed are methods, compositions, and systems that can assay multiple biologically active components at the same time, thus reducing costs. Further, methods, compositions, and systems are needed to determine the concentration of a biologically active component in a fluid solution.

SUMMARY

In certain example aspects, provided is a nanopore protein conjugate that includes a nanopore protein monomer and a capture tag. For example, the nanopore protein conjugate can include an amino acid sequence having at least 60%, 65%, 70%, 80%, 90%, or 95% or more sequence identity to the sequence set forth as SEQ ID NO: 4 or SEQ ID NO: 7.

In certain example aspects, provided is an analyte detection complex that includes the nanopore protein conjugate. For example, the analyte detection complex includes an analyte ligand that is joined to the nanopore protein conjugate, such as via an isopeptide linkage.

In certain example aspects, provided is a nanopore assembly that includes at least one analyte detection complex. For example, the nanopore assembly can be a heptameric nanopore assembly that includes an analyte detection complex. In certain example aspects, the nanopore monomer of the conjugate is an alpha-hemolysin monomer and each of the other six monomers of the heptamer are alpha-hemolysin monomers.

In certain example aspects, provided is a method for detecting an analyte in a fluid solution. The method includes providing a chip including a nanopore assembly as described herein. For example, the nanopore assembly includes an analyte detection complex, the analyte detection complex including a nanopore monomer, a capture tag, and an analyte ligand. Further, the nanopore assembly is disposed within a membrane of the chip. A sensing electrode is then placed adjacent to or in proximity to the membrane. A first capture rate of the capture tag is the determined, with the aid of a computer processor and the sensing electrode. The nanopore assembly is then contacted with an analyte, the analyte having a binding affinity to the analyte ligand of the analyte detection complex. Using the computer processor and the sensing electrode, a second capture rate of the capture tag is then determined. The second capture rate, for example, provides an indication that the analyte is bound to the analyte ligand of the analyte detection complex and hence that the analyte is present in the fluid solution. The second capture rate, for example, can be less than or greater than the first capture rate. Further, based on the identity of the analyte ligand—and on the indication that the analyte is bound to the analyte ligand—the identity of the analyte can be determined.

In further example aspects, provided is a method for determining the concentration of an analyte in a fluid solution. The method includes providing a chip having a nanopore assembly as described herein, the nanopore assembly being disposed within a membrane. The nanopore assembly includes, for example, an analyte detection complex, the analyte detection complex including a nanopore monomer, a capture tag, and an analyte ligand. A sensing electrode is positioned adjacent or in proximity to the membrane. Thereafter, and with the aid of a computer processor and the sensing electrode, a first capture rate of the capture tag of the nanopore assembly is determined. The nanopore assembly is then contacted with an analyte, the analyte having a binding affinity for the analyte ligand of the analyte detection complex. With the aid of the computer processor and the sensing electrode, a first transition from the first capture rate to a second capture rate of the capture tag of the analyte detection complex is identified. Then, with the aid of the computer processor and the sensing electrode, a second transition from the second capture rate to a capture rate that approximates the first capture rate is identified. Based at least in part on the identification of the first transition and the second transition, the concentration of the analyte in the fluid solution is then determined. For example, the time interval between the transition rates can be used to determine the concentration of the analyte.

In still further example aspects, provided is a system for determining the concentration of analyte in a fluid solution. The system can also be used to detect an analyte in solution. The system includes, for example, a chip having a nanopore assembly that is disposed within a membrane of the chip. The nanopore assembly, for example, includes at least one nanopore protein monomer having a capture tag and an analyte ligand. The system further includes a sensing electrode positioned adjacent to or in proximity to the membrane. The sensing electrode, for example, is configured to detect a signal from the nanopore assembly. The system further includes a computer processer that, along with the sensing electrode, is configured to identify a first transition and a second transition associated with the nanopore assembly. The first transition, for example, corresponds to binding of an analyte to the analyte ligand. The second transition, for example, corresponds to dissociation of the analyte from the analyte ligand.

In certain example aspects of the system, a concentration of the analyte in the fluid solution is determined based at least in part on the identified first transition and the identified second transition. In certain example aspects of the system, the nanopore protein monomer is an alpha-hemolysin monomer or an OmpG monomer. In certain example aspects of the system, the nanopore protein conjugate includes an amino acid sequence having at least 80%, 90%, 95%, 98% or more sequence identity to the sequence set forth as SEQ ID NO: 4 or SEQ ID NO:7. In certain example aspects of the system, the capture tag includes an amino acid sequence having at least 80%, 90%, 95%, 98% or more sequence identity to the sequence set forth as SEQ ID NO: 8.

These and other aspects, objects, features and advantages of the example embodiments will become apparent to those having ordinary skill in the art upon consideration of the following detailed description of illustrated example embodiments.

BRIEF DESCRIPTION OF THE DRAWINGS

FIGS. 4A-4C are illustrations showing different pore states that are associated with different capture rates, in accordance with certain example embodiments. More particularly, FIG. 4A shows a nanopore assembly that includes a nanopore protein conjugate, but that does not include an analyte ligand (and hence does not include an analyte detection complex). Such a pore is associated with a baseline capture rate of the capture tag (solid line vs. dashed line, showing capture). FIG. 4B shows the same nanopore assembly, but with an analyte ligand (e.g., a nanobody) attached. Hence, the nanopore assembly of FIG. 4B includes an analyte detection complex. The nanopore assembly of FIG. 4B is associated with a first capture rate of the capture tag (solid line vs. dashed line, showing capture). FIG. 4C shows the same pore as in FIG. 4B, but now with the analyte (e.g., an antigen to the nanobody) attached. Such a pore is associated with a second capture rate of the capture tag (solid line vs. dashed line, showing capture).

FIG. 5A is a graph showing measurement of a baseline capture rate. FIG. 5B is a graph showing measurement of a first capture rate in which an analyte ligand bound to the nanopore protein conjugate of the nanopore assembly, thereby forming an analyte detection complex. In FIG. 5B, an analyte is not present. FIG. 5C shows the measurement of capture rates for the first capture rate (no analyte bound) and the second capture rate (analyte bound). Also shown is a first transition from the first capture rate to the second capture rate and a second transition from the second capture rate back to the first capture rate.

DETAILED DESCRIPTION OF THE EXAMPLE EMBODIMENTS

Figure 1:
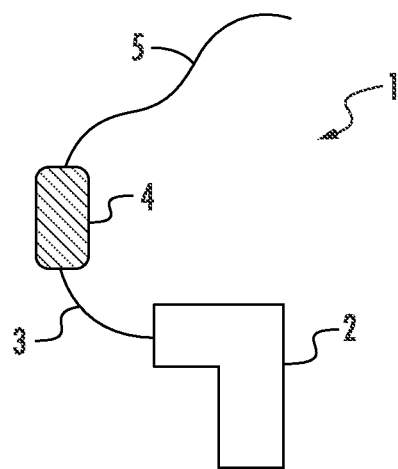
FIG. 1 is an illustration showing a nanopore protein conjugate, in accordance with certain example embodiments.

The embodiments described herein can be understood more readily by reference to the following detailed description, examples, and claims, and their previous and following description. Before the present system, devices, compositions and/or methods are disclosed and described, it is to be understood that the embodiments described herein are not limited to the specific systems, devices, and/or compositions methods disclosed unless otherwise specified, as such can, of course, vary. It is also to be understood that the terminology used herein is for describing particular aspects only and is not intended to be limiting.

Further, the following description is provided as an enabling teaching of the various embodiments in their best, currently known aspect. Those skilled in the relevant art will recognize that many changes can be made to the aspects described, while still obtaining the beneficial results of this disclosure. It will also be apparent that some of the desired benefits of the present invention can be obtained by selecting some of the features of the various embodiments without utilizing other features. Accordingly, those who work in the art will recognize that many modifications and adaptations to the various embodiments described herein are possible and can even be desirable in certain circumstances and are a part of the present disclosure. Thus, the following description is provided as illustrative of the principles of the embodiments described herein and not in limitation thereof.

Overview

As disclosed herein, provided are methods, compositions, and systems for the detection of a target analyte. Also provided are methods, compositions, and systems for determining the concentration one or more target analytes in a fluid solution. The compositions include nanopore conjugates in which a nanopore protein monomer is joined to a capture tag. Tethered to the nanopore protein conjugate is an analyte ligand that can be directed to specific analyte. As described herein, when a voltage is applied across a nanopore assembly including the nanopore conjugate, the nanopore captures the capture tag at a given capture rate. In the presence of the analyte to the analyte ligand, however, the capture rate of the capture tag changes, thus permitting detection of the analyte by the nanopore assembly. Further, based on the capture rate associated with binding between the analyte and the analyte ligand, the concentration of the analyte can be determined in certain examples.

More particularly, the nanopore protein monomer of the nanopore conjugate described herein can be any type of biological nanopore protein monomer. For example, the nanopore protein monomer can be an alpha-hemolysin (α-HL) monomer, an OmpG monomer, or other protein nanopore monomer. When the nanopore protein monomer is alpha-hemolysin, for example, the resultant nanopore protein conjugate is an alpha-hemolysin/capture tag protein conjugate.

By using an alpha-hemolysin nanopore monomer to form the conjugate, for example, the alpha-hemolysin monomer of the conjugate is available to oligomerize with other α-HL monomers, thereby forming a heptameric nanopore assembly. The heptameric assembly, for example, can have one alpha-hemolysin/capture-tag conjugate and six alpha-hemolysin monomers, such as six wild-type alpha-hemolysin monomers. In such examples, the capture tag of the protein conjugate is configured to interact with the heptameric nanopore assembly in the presence of a voltage. In certain examples, the capture tag is fused to an alpha-hemolysin via a linker sequence during the synthesis of the alpha-hemolysin monomer, thereby forming the nanopore protein conjugate. The capture tag, for example, is any molecule that the nanopore can capture and release, thereby resulting in a detectable capture rate.

In addition to including a capture tag, the nanopore protein conjugate is tethered to an analyte ligand. The analyte ligand, for example, can be any ligand that binds an analyte. In certain examples, the analyte ligand is a nanobody, such as an antibody or fragment thereof that binds an antigen or fragment thereof when in the presence of the antigen. The analyte ligand can be bound to the nanopore protein conjugate directly or indirectly, such as via a peptide linker sequence. For example, the nanopore protein conjugate can include a region for tethering an analyte ligand to the nanopore assembly. In certain examples, the nanopore protein conjugate can include a SpyTag sequence. In such examples, the analyte ligand can be joined to a SpyCatcher sequence. Hence, the analyte ligand can be tethered to the nanopore protein conjugate via a SpyTag/SpyCatcher linkage. In certain examples, the capture tag described herein can be joined to the analyte ligand.

When assembled into a membrane of a chip, a nanopore protein assembly including a nanopore protein conjugate and an analyte ligand as described herein can be used to identify an analyte in a fluid solution, and/or to determine the concentration of the analyte. Without wishing to be bound by any particular theory, when the chip is contacted with a fluid solution containing the analyte, it is believed that the proximity of the analyte-ligand binding pair to the capture tag alters the interaction of the capture tag with the pore, thus affecting the capture rate of the capture tag. An electrode that is near the membrane can then detect the change in the capture rate, thus providing an indication that the analyte is bound to the analyte ligand—and hence that the ligand is present in the fluid solution. Further, using association/dissociation kinetics, the concentration of the analyte can be determined based upon the capture rate of the capture tag. That is, the changes in the capture rates can be used to determine the $K_a$ and/or $K_d$ for the analyte, and—with other known variables—the determined $K_a$ and/or $K_d$ can be used to determine the concentration of the analyte in the fluid solution.

In other examples, different nanopore protein assemblies that are directed to different analytes can be used on a single chip to detect and/or determine the concentration of different analytes on the same chip. In such examples, the different nanopore protein assemblies can be configured to produce different signals that are detectable by the sensing electrode. For example, various parameters—such as the size of the open pore channel of the pore, different capture tags, and/or the placement of additional capture tags the trans side of the membrane—can be used to alter the baseline signal that a given set of pores generate. With such configurations, for example, a pore with a larger opening can provide a stronger signal than a pore with a smaller opening, thus permitting differentiation of the pores on the same chip. The different pores can then be correlated with the analytes they are configured to detect, thus permitting identification of different analytes on the same chip. Further, the concentration of each detected analyte can be determined as described herein using association/dissociation kinetics.

Summary of Terms

The invention will now be described in detail by way of reference only using the following definitions and examples. Unless defined otherwise herein, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described. It is to be understood that this invention is not limited to the particular methodology, protocols, and reagents described, as these may vary.

The headings provided herein are not limitations of the various aspects or embodiments of the invention which can be had by reference to the specification as a whole. Accordingly, the terms defined immediately below are more fully defined by reference to the specification as a whole.

As used herein, the singular forms "a," "an" and "the" include plural referents unless the context clearly dictates otherwise.

Ranges or values can be expressed herein as from "about" one particular value, and/or to "about" another particular value. When such a range is expressed, another aspect includes from the one particular value of the range and/or to the other particular value of the range. It will be further understood that the endpoints of each of the ranges are significant both in relation to the other endpoint, and independently of the other endpoint. Similarly, when values are expressed as approximations, by use of the antecedent "about," it will be understood that the particular value forms another aspect. In certain example embodiments, the term "about" is understood as within a range of normal tolerance in the art for a given measurement, for example, such as within 2 standard deviations of the mean. In certain example embodiments, depending on the measurement "about" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein can be modified by the term about. Further, terms used herein such as "example," "exemplary,"

or "exemplified," are not meant to show preference, but rather to explain that the aspect discussed thereafter is merely one example of the aspect presented.

As used herein, the term "antibody" broadly refers to any immunoglobulin (Ig) molecule comprised of four polypeptide chains, two heavy (H) chains and two light (L) chains, or any functional fragment, mutant, variant, or derivation thereof, which retains the essential epitope binding features of an Ig molecule. Such mutant, variant, or derivative antibody entities are known in the art. A functional fragment of the antibody, for example, includes a portion of the antibody that, when separated from the antibody as whole retains the ability to bind or partially bind the antigen to which the antibody is directed. A "nanobody," for example, single-domain antibody fragment.

As used herein, the term "amino acid" is an organic compound containing an amino group and a carboxylic acid group. A peptide or polypeptide contains two or more amino acids. For purposes herein, amino acids include the twenty naturally-occurring amino acids, non-natural amino acids and amino acid analogs (i.e., amino acids wherein the α-carbon has a side chain).

As used herein, "polypeptide" as used herein, refers to any polymeric chain of amino acids. The terms "peptide" and "protein" are used interchangeably with the term polypeptide and also refer to a polymeric chain of amino acids. The term "polypeptide" encompasses native or artificial proteins, protein fragments and polypeptide analogs of a protein sequence. A polypeptide may be monomeric or polymeric, and may include a number of modifications. Generally, a peptide or polypeptide is greater than or equal to 2 amino acids in length, and generally less than or equal to 40 amino acids in length.

As used herein, "alpha-hemolysin," "α-hemolysin," "α-HL," "a-HL," and "hemolysin" are used interchangeably and refer to the monomeric protein that self-assembles into a heptameric water-filled transmembrane channel (i.e., nanopore). Depending on context, the term may also refer to the transmembrane channel formed by seven monomeric proteins. In certain example embodiments, the alpha-hemolysin is a "modified alpha-hemolysin," meaning that alpha-hemolysin originated from another (i.e., parental) alpha-hemolysin and contains one or more amino acid alterations (e.g., amino acid substitution, deletion, or insertion) compared to the parental alpha-hemolysin. In some example embodiments, a modified alpha-hemolysin of the invention is originated or modified from a naturally-occurring or wild-type alpha-hemolysin. In some example embodiments, a modified alpha-hemolysin is originated or modified from a recombinant or engineered alpha-hemolysin including, but not limited to, chimeric alpha-hemolysin, fusion alpha-hemolysin or another modified alpha-hemolysin. Typically, a modified alpha-hemolysin has at least one changed phenotype compared to the parental alpha-hemolysin. In certain example embodiments, the alpha-hemolysin arises from a "variant hemolysin gene" or is a "variant hemolysin," which means, respectively, that the nucleic acid sequence of the alpha-hemolysin gene from *Staphylococcus aureus* has been altered by removing, adding, and/or manipulating the coding sequence or the amino acid sequence of the expressed protein has been modified consistent with the invention described herein.

As used herein, the term "analyte" or "target analyte" refers broadly to any compound, molecule, or other substance of interest to be detected, identified, or characterized. For example, term "analyte" or "target analyte" includes any physiological molecule or agent of interest that is a specific substance or component that is being detected and/or measured. In certain example embodiments, the analyte is a physiological analyte of interest. Additionally or alternatively, the analyte can be a chemical that has a physiological action, for example, or a drug or pharmacological agent. Additionally or alternatively, the analyte or target analyte can be an environmental agent or other chemical agent or entity. The term "agent" is used herein to denote a chemical compound, a mixture of chemical compounds, a biological macromolecule, or an extract made from biological materials. For example, an agent can be a cytotoxic agent.

In certain examples embodiments, the term "analytes" or "target analytes" include toxins, organic compounds, proteins, peptides, microorganisms, amino acids, carbohydrates, nucleic acids, hormones, steroids, vitamins, drugs (including those administered for therapeutic purposes as well as those administered for illicit purposes), lipids, virus particles, and metabolites of or antibodies to any of the above substances. For example, analytes can include ferritin; creatinine kinase MIB (CK-MIB); digoxin; phenytoin; phenobarbitol; carbamazepine; vancomycin; gentamycin; theophylline; valproic acid; quinidine; leutinizing hormone (LH); follicle stimulating hormone (FSH); estradiol, progesterone; IgE antibodies; vitamin B2 micro-globulin; glycated hemoglobin (Gly. Hb); cortisol; digitoxin; N-acetylprocainamide (NAPA); procainamide; antibodies to rubella, such as rubella-IgG and rubella-IgM; antibodies to toxoplasmosis, such as toxoplasmosis IgG (Toxo-IgG) and toxoplasmosis IgM (Toxo-IgM); testosterone; salicylates; acetaminophen; hepatitis B virus surface antigen (HBsAg); antibodies to hepatitis B core antigen, such as anti-hepatitis B core antigen IgG and IgM (Anti-HBC); human immune deficiency virus 1 and 2 (HTLV); hepatitis B e antigen (HBeAg); antibodies to hepatitis B e antigen (Anti-Hbe); thyroid stimulating hormone (TSH); thyroxine (T4); total triiodothyronin (Total T3); free triiodiothyronin (Free T3); carcinoembryoic antigen (CEA); and alpha fetal protein (AF); and drugs of abuse and controlled substances, including but not intended to be limited to, amphetamine; methamphetamine; barbituates such as amobarbital, seobarbital, pentobarbital, phenobarbital, and barbital; benzodiazepines such as librium and valium; cannabinoids such as hashish and marijuana; cocaine; fetanyl; LSD; methapualone; opiaets such as heroin, morphine, codine, hydromorphone, hydrocodone, methadone, oxycodone, oxymorphone and opium; phencyclidine; and propoxyhene. The term analyte also includes any antigenic substances, haptens, antibodies, macromolecules and combinations thereof Other example analytes or target analytes include, Folate, Folate RBC, Iron, Soluble transferrin receptor, Transferrin, Vitamin B12, Lactate Dehydrogenase, Bone Calcium, N-MID Osteocalcin, P1NP, Phosphorus, PTH, PTH (1-84), b-CrossLaps, Vitamin D, Cardiac Apolipoprotein A1, Apolipoprotein B, Cholesterol, CK, CK-MB, CK-MB (mass), CK-MB (mass) STAT, CRP hs, Cystatin C, D-Dimer, Cardiac Digitoxin, Digoxin, GDF-154, HDL Cholesterol direct, Homocysteine, Hydroxybutyrat Dehydrogenase, LDL Cholesterol direct, Lipoprotein (a), Myoglobin, Myoglobin STAT, NT-proBNP, NT-proBNP STAT, 1 Troponin I, 1 Troponin I STAT, Troponin T hs, Troponin T hs STAT, Coagulation AT III, D-Dimer, Drugs of Abuse Testing Amphetamines (Ecstasy), Benzodiazepines, Benzodiazepines (Serum), Cannabinoids, Cocaine, Ethanol, Methadone, Methadone metabolites (EDDP), Methaqualone, Opiates, Oxycodone, 3, Phencyclidine, Propoxyphene, amylase, ACTH, Anti-Tg, Anti-TPO, Anti-TSH-R, Calcitonin, Cortisol, C-Peptide, FT3, FT4, hGH, Hydroxybutyrate Dehydrogenase, IGF-14, Insulin, Lipase, PTH STAT, T3, T4, Thyreoglobulin (TG II), Thyreoglobulin confirmatory, TSH, T-uptake, Fertility Anti Muellerian Hormone, DHEA-S, Estradiol, FSH, hCG, hCG plus beta, LH, Progesterone, Prolactin, SHBG, Testosterone, Hepatology AFP, Alkaline phosphatase (IFCC), Alkaline phosphatase (opt.), 3, ALT/GPT with Pyp, ALT/GPT without Pyp, Ammonia, Anti-HCV, AST/GOT with Pyp, AST/GOT without Pyp, Bilirubin—direct, Bilirubin—total, Cholinesterase Acetyl, 3 Cholinesterase Butyryl, Gamma Glutamyl Transferase, Glutamate Dehydrogenase, HBeAg, HBsAg, Lactate Dehydrogenase, Infectious Diseases Anti-HAV, Anti-HAV IgM, Anti-HBc, Anti-HBc IgM, Anti-HBe, HBeAg, Anti-HBsAg, HBsAg, HBsAg confirmatory, HBsAg quantitative, Anti-HCV, Chagas 4, CMV IgG, CMV IgG Avidity, CMV IgM, HIV combi PT, HIV-Ag, HIV-Ag confirmatory, HSV-1 IgG, HSV-2 IgG, HTLV-I/II, Rubella IgG, Rubella IgM, Syphilis, Toxo IgG, Toxo IgG Avidity, Toxo IgM, TPLA (Syphilis), Anti-CCP, ASLO, C3c, C4, Ceruloplasmin, CRP (Latex), Haptoglobin, IgA , IgE, IgG, IgM, Immunglobulin A CSF, Immunglobulin M CSF, Interleukin 6, Kappa light chains, Kappa light chains free6, 2,3, Lambda light chains, Lambda light chains free6, 2,3, Prealbumin, Procalcitonin, Rheumatoid factor, a1-Acid Glycoprotein, a1-Antitrypsin, Bicarbonate (CO2), Calcium, Chloride, Fructosamine, Glucose, HbA1c (hemolysate), HbA1c (whole blood), Insulin, Lactate, LDL Cholesterol direct, Magnesium, Potassium, Sodium, Total Protein, Triglycerides, Triglycerides Glycerol blanked, Vitamin D total, Acid phosphatase, AFP, CA 125, CA 15-3, CA 19-9, CA 72-4, Calcitonin, Cyfra 21-1, hCG plus beta, HE4, Kappa light chains free6, 2,3, Lambda light chains free6, 2,3, NSE, proGRP, PSA free, PSA total, SCC, S-100, Thyreoglobulin (TG II), Thyreoglobulin confirmatory, b2-Microglobulin, Albumin (BCG), Albumin (BCP), Albumin immunologic, Creatinine (enzymatic), Creatinine (Jaffe), Cystatin C, Potassium, PTH, PTH (1-84), Total Protein, Total Protein, Urine/CSF, Urea/BUN, Uric acid, a1-Microglobulin, b2-Microglobulin, Acetaminophen (Paracetamol), Amikacin, Carbamazepine, Cyclosporine, Digitoxin, Digoxin, Everolimus, Gentamicin, Lidocaine, Lithium, ISE Mycophenolic acid, NAPA, Phenobarbital, Phenytoin, Primidone, Procainamide, Quinidine, Salicylate, Sirolimus, Tacrolimus, Theophylline, Tobramycin, Valproic Acid, Vancomycin, Anti Muellerian Hormone, AFP, b-Crosslaps, DHEA-S, Estradiol, FSH, free ßhCG, hCG, hCG plus beta, hCG STAT, HE4, LH, N-MID Osteocalcin, PAPP-A, P1GF, sFIt-1, P1NP, Progesterone, Prolactin, SHBG, Testosterone, CMV IgG, CMV IgG Avidity, CMV IgM, Rubella IgG, Rubella IgM, Toxo IgG, Toxo IgG Avidity, and/or Toxo IgM.

The term "ligand" or "analyte ligand" as used herein refers broadly to any compound, molecule, molecular group, or other substance that binds to another entity (e.g., receptor) to form a larger complex. For example, an analyte ligand is an entity that has binding affinity for an analyte, as that term is understood in the art and broadly defined herein. Examples of analyte ligands include, but are not limited to, peptides, carbohydrates, nucleic acids, antibodies, or any molecules that bind to receptors. In certain examples, the ligand forms a complex with an analyte to serve a biological purpose. As those skilled in the art will appreciate, the relationship between a ligand and its binding partner (e.g., an analyte) is a function of charge, hydrophobicity, and molecular structure. Binding can occur via a variety of intermolecular forces, such as ionic bonds, hydrogen bonds, and Van der Waals forces. In certain examples, the ligand or analyte ligand is an antibody or functional fragment thereof having binding affinity with an antigen.

As used herein, the term "DNA" refers to a molecule comprising at least one deoxyribonucleotide residue, as commonly understood in the art. A "deoxyribonucleotide" is a nucleotide without a hydroxyl group and instead a hydrogen at the 2' position of a β-D-deoxyribofuranose moiety. The term encompasses double stranded DNA, single stranded DNA, DNAs with both double stranded and single stranded regions, isolated DNA such as partially purified DNA, essentially pure DNA, synthetic DNA, recombinantly produced DNA, as well as altered DNA, or analog DNA, that differs from naturally occurring DNA by the addition, deletion, substitution, and/or modification of one or more nucleotides.

As used herein, the term "join," "joined," "link," "linked," or "tethered" refers to any method known in the art for functionally connecting two or more entities, such as connecting a protein to a DNA molecule or a protein to a protein. For example, one protein may be linked to another protein via a covalent bond, such as in a recombinant fusion protein, with or without intervening sequences or domains. Example covalent linkages may be formed, for example, through SpyCatcher/SpyTag interactions, cysteine-maleimide conjugation, or azide-alkyne click chemistry, as well as other means known in the art. Further, one DNA molecule can be linked to another DNA molecule via hybridization of complementary DNA sequences.

As used herein, the term "nanopore" generally refers to a pore, channel, or passage formed or otherwise provided in a membrane. A membrane may be an organic membrane, such as a lipid bilayer, or a synthetic membrane, such as a membrane formed of a polymeric material. The membrane may be a polymeric material. The nanopore may be disposed adjacent or in proximity to a sensing circuit or an electrode coupled to a sensing circuit, such as, for example, a complementary metal-oxide semiconductor (CMOS) or field effect transistor (FET) circuit. In some example embodiments, a nanopore has a characteristic width or diameter on the order of 0.1 nanometers (nm) to about 1000 nm. Some nanopores are proteins. Alpha-hemolysin monomers, for example, oligomerize to form a protein. The membrane includes a trans side (i.e., side facing the sensing electrode) and a cis side (i.e., side facing the counter electrode).

The term "nucleic acid molecule" or "nucleic acid" includes RNA, DNA and cDNA molecules. It will be understood that, as a result of the degeneracy of the genetic code, a multitude of nucleotide sequences encoding a given protein such as alpha-hemolysin and/or variants thereof may be produced. The present disclosure contemplates every possible variant nucleotide sequence, encoding variant alpha-hemolysin, all of which are possible given the degeneracy of the genetic code.

The term "nucleotide" is used herein as recognized in the art to include natural bases (standard), and modified bases well known in the art. Such bases are generally located at the 1' position of a nucleotide sugar moiety. Nucleotides generally comprise a base, sugar, and a phosphate group.

As used herein, "synthetic," such as with reference to, for example, a synthetic nucleic acid molecule or a synthetic gene or a synthetic peptide refers to a nucleic acid molecule or polypeptide molecule that is produced by recombinant methods and/or by chemical synthesis methods.

As used herein, production by recombinant methods by using recombinant DNA methods refers to the use of the well-known methods of molecular biology for expressing proteins encoded by cloned DNA. For example, standard techniques may be used for recombinant DNA, oligonucleotide synthesis, and tissue culture and transformation (e.g., electroporation, lipofection). Enzymatic reactions and purification techniques may be performed according to manufacturer's specifications or as commonly accomplished in the art or as described herein. The foregoing techniques and procedures may be generally performed according to conventional methods well known in the art and as described in various general and more specific references that are cited and discussed throughout the present specification. See, e.g., Sambrook et al. Molecular Cloning: A Laboratory Manual (2d ed., Cold Spring Harbor Laboratory Press, Cold Spring Harbor, N.Y. (1989)), which is incorporated herein by reference for any purpose.

As used herein, "vector" (or plasmid) refers to discrete DNA elements that are used to introduce heterologous nucleic acid into cells for either expression or replication thereof. The vectors typically remain episomal, but can be designed to effect integration of a gene or portion thereof into a chromosome of the genome. Also contemplated are vectors that are artificial chromosomes, such as bacterial artificial chromosomes, yeast artificial chromosomes and mammalian artificial chromosomes. Selection and use of such vehicles are well known to those of skill in the art.

As used herein, "expression" refers generally to the process by which a nucleic acid is transcribed into mRNA and translated into peptides, polypeptides, or proteins. If the nucleic acid is derived from genomic DNA, expression can, if an appropriate eukaryotic host cell or organism is selected, include processing, such as splicing of the mRNA.

As used herein, an "expression vector" includes vectors capable of expressing DNA that is operatively linked with regulatory sequences, such as promoter regions, that are capable of effecting expression of such DNA fragments. Such additional segments can include promoter and terminator sequences, and optionally can include one or more origins of replication, one or more selectable markers, an enhancer, a polyadenylation signal, and the like. Expression vectors are generally derived from plasmid or viral DNA, or can contain elements of both. Thus, an expression vector refers to a recombinant DNA or RNA construct, such as a plasmid, a phage, recombinant virus or other vector that, upon introduction into an appropriate host cell, results in expression of the cloned DNA. Appropriate expression vectors are well known to those of skill in the art and include those that are replicable in eukaryotic cells and/or prokaryotic cells and those that remain episomal or those which integrate into the host cell genome. As used herein, vector also includes "virus vectors" or "viral vectors." Viral vectors are engineered viruses that are operatively linked to exogenous genes to transfer (as vehicles or shuttles) the exogenous genes into cells.

By the term "host cell," it is meant a cell that contains a vector and supports the replication, and/or transcription or transcription and translation (expression) of the expression construct. Host cells can be prokaryotic cells, such as *E. coli* or *Bacillus subtilus*, or eukaryotic cells such as yeast, plant, insect, amphibian, or mammalian cells. In general, host cells are prokaryotic, e.g., *E. coli*.

The terms "cellular expression" or "cellular gene expression" generally refer to the cellular processes by which a biologically active polypeptide is produced from a DNA sequence and exhibits a biological activity in a cell. As such, gene expression involves the processes of transcription and translation, but can also involve post-transcriptional and post-translational processes that can influence a biological activity of a gene or gene product. These processes include, for example, RNA synthesis, processing, and transport, as well as polypeptide synthesis, transport, and post-translational modification of polypeptides. Additionally, processes that affect protein-protein interactions within the cell can also affect gene expression as defined herein.

As used herein, the term "optional" or "optionally" means that the subsequently described event or circumstance does or does not occur, and that the description includes instances where said event or circumstance occurs and instances where it does not. For example, an optional step of joining an analyte detection complex to a nanopore assembly monomer means that that the analyte detection complex can be joined or not joined.

The term "phospholipid" as used herein, refers to a hydrophobic molecule comprising at least one phosphorus group. For example, a phospholipid can comprise a phosphorus-containing group and saturated or unsaturated alkyl group, optionally substituted with OH, COOH, oxo, amine, or substituted or unsubstituted aryl groups.

As used herein, the term "membrane" refers to a sheet or layer of continuous double layer of lipid molecules, in which membrane proteins are embedded. Membrane lipid molecules are typically amphipathic, and most spontaneously form bilayers when placed in water. A "phospholipid membrane" refers to any structure composed of phospholipids aligned such that the hydrophobic heads of the lipids point one way while the hydrophilic tails point the opposite way. Examples of phospholipid membranes include the lipid bilayer of a cellular membrane.

As used herein, "identity" or "sequence identity" refers to, in the context of a sequence, the similarity between two nucleic acid sequences, or two amino acid sequences, and is expressed in terms of the similarity between the sequences, otherwise referred to as sequence identity. Sequence identity is frequently measured in terms of percentage identity (or similarity or homology); the higher the percentage, the more similar the two sequences are. For example, 80% homology means the same thing as 80% sequence identity determined by a defined algorithm, and accordingly a homologue of a given sequence has greater than 80% sequence identity over a length of the given sequence. Example levels of sequence identity include, for example, 80, 85, 90, 95, 98% or more sequence identity to a given sequence, e.g., the coding sequence for any one of the inventive polypeptides, as described herein.

Methods of alignment of sequences for comparison are well known in the art. Various programs and alignment algorithms are described in: Smith & Waterman Adv. Appl. Math. 2: 482, 1981; Needleman & Wunsch J. Mol. Biol. 48: 443, 1970; Pearson & Lipman Proc. Natl. Acad. Sci. USA 85: 2444, 1988; Higgins & Sharp Gene 73: 237-244, 1988; Higgins & Sharp CABIOS 5: 151-153, 1989; Corpet et al. Nuc. Acids Res. 16, 10881-90, 1988; Huang et al. Computer Appls. In the Biosciences 8, 155-65, 1992; and Pearson et al. Meth. Mol. Bio. 24, 307-31, 1994. Altschul et al. (J. Mol. Biol. 215: 403-410, 1990), presents a detailed consideration of sequence alignment methods and homology calculations.

The NCBI Basic Local Alignment Search Tool (BLAST) (Altschul et al. J. Mol. Biol. 215: 403-410, 1990) is available from several sources, including the National Center for Biotechnology Information (NCBI, Bethesda, MD) and on the Internet, for use in connection with the sequence analysis programs that include, for example, the suite of BLAST programs, such as BLASTN, BLASTX, and TBLASTX, BLASTP and TBLASTN.

Sequence searches are typically carried out using the BLASTN program when evaluating a given nucleic acid sequence relative to nucleic acid sequences in the GenBank DNA Sequences and other public databases. The BLASTX program is preferred for searching nucleic acid sequences that have been translated in all reading frames against amino acid sequences in the GenBank Protein Sequences and other public databases. Both BLASTN and BLASTX are run using default parameters of an open gap penalty of 11.0, and an extended gap penalty of 1.0, and utilize the BLOSUM-62 matrix. (See, e.g., Altschul, S. F., et al., Nucleic Acids Res. 25: 3389-3402, 1997).

In certain example embodiments, a preferred alignment of selected sequences in order to determine "% identity" between two or more sequences, is performed using for example, the CLUSTAL-W program in MacVector version 13.0.7, operated with default parameters, including an open gap penalty of 10.0, an extended gap penalty of 0.1, and a BLOSUM 30 similarity matrix.

As used herein, the term "variant" refers to a modified protein which displays altered characteristics when compared to the parental protein, e.g., altered ionic conductance.

As used herein, the term "sample" is used in its broadest sense. A "biological sample," as used herein, includes, but is not limited to, any quantity of a substance from a living thing or formerly living thing, such as from a subject. A biological sample can include a sample of biological tissue or fluid origin obtained in vivo or in vitro. Such samples can be from, without limitation, body fluids, organs, tissues, fractions, and cells isolated from a biological subject. Biological samples can also include extracts from a biological sample, such as for example an extract from a biological fluid (e.g., blood or urine).

As used herein, a "biological fluid" or "biological fluid sample" refers to any physiologic fluid (e.g., blood, blood plasma, sputum, lavage fluid, ocular lens fluid, cerebrospinal fluid, urine, semen, sweat, tears, milk, saliva, synovial fluid, peritoneal fluid, amniotic fluid), as well as solid tissues that have, at least in part, been converted to a fluid form through one or more known protocols or for which a fluid has been extracted. For example, a liquid tissue extract, such as from a biopsy, can be a biological fluid sample. In certain examples, a biological fluid sample is a urine sample collected from a subject. In certain examples, the biological fluid sample is a blood sample collected from a subject. As used herein, the terms "blood," "plasma" and "serum" include fractions or processed portions thereof. Similarly, where a sample is taken from a biopsy, swab, smear, etc., the "sample" encompasses a processed fraction or portion derived from the biopsy, swab, smear, etc.

Further, a "fluid solution," "fluid sample" or "fluid" encompass biological fluids but can also include and encompass non-physiological components, such as any analyte that may be present in an environmental sample. For example, the sample may be from a river, lake, pond, or other water reservoir. In certain example embodiments, the fluid sample can be modified. For example, a buffer or preservative can be added to the fluid sample, or the fluid sample can be diluted. In other example embodiments, the fluid sample can be modified by common means known in the art to increase the concentration of one or more solutes in the solution. Regardless, the fluid solution is still a fluid solution as described herein.

As used herein, a "subject" refers to an animal, including a vertebrate animal. The vertebrate can be a mammal, for example, a human. In certain examples, the subject can be a human patient. A subject can be a "patient," for example, such as a patient suffering from or suspected of suffering from a disease or condition and can be in need of treatment or diagnosis or can be in need of monitoring for the progression of the disease or condition. The patient can also be in on a treatment therapy that needs to be monitored for efficacy. A mammal refers to any animal classified as a mammal, including, for example, humans, chimpanzees, domestic and farm animals, as well as zoo, sports, or pet animals, such as dogs, cats, cattle, rabbits, horses, sheep, pigs, and so on.

As used herein, the term "wild-type" refers to a gene or gene product which has the characteristics of that gene or gene product when isolated from a naturally-occurring source.

As used herein, the conventional one-letter and three-letter codes for amino acid residues are used. For ease of reference, sequence variants are described by use of the following nomenclature: Original amino acid(s): position(s): substituted amino acid(s). According to this nomenclature, for instance the substitution of threonine by an arginine in position 17 is shown as Thr17Arg or T17R. Multiple mutations are separated by plus signs, for example: Thr17Arg+Glu34Ser or T17R+E34S, representing mutations in positions 17 and 34 substituting a threonine and glutamic acid with an arginine and serine, respectively.

Example Embodiments

The example embodiments are now described in detail, in part with reference to the accompanying figures. Where figures are referenced, like numerals indicate like (but not necessarily identical) elements throughout the figures.

Nanopore Protein Conjugates

Provided herein are compositions that include nanopore protein conjugates. As shown in FIG. 1, the conjugates 1 can include a nanopore monomer 2 that is joined to a capture tag 5, in accordance with certain example embodiments. The nanopore protein conjugate 1 can also include an analyte ligand attachment site 4. Hence, the resultant nanopore protein conjugate 1 can include a nanopore monomer domain, an analyte ligand attachment domain, and a capture tag domain. Such nanopore protein conjugates 1 can be used, for example, to form an analyte detection complex that, as described herein, is able to interact with and facilitate detection of an analyte as described herein. In certain example embodiments, the nanopore protein conjugate 1 conjugate can also include one or more linker domains 3 that join various components of the nanopore protein conjugate 1.

The nanopore protein monomer 2 of the nanopore protein conjugate 1 can include any nanopore protein that, when positioned in a substrate such as a membrane, allows the passage of a molecule through the substrate. Examples of nanopores include proteinaceous or protein-based pores or synthetic pores. In certain example embodiments, a nanopore may have an inner diameter of 1-10 nm or 1-5 nm or 1-3 nm. Examples of protein pores include for example, alpha-hemolysin, voltage-dependent mitochondrial porin (VDAC), OmpF, OmpG, OmpC, MspA and LamB (malto-porin) (see, e.g., Rhee, M. et al., Trends in Biotechnology, 25(4) (2007): 174-181). In certain example embodiments, the pore protein may be a modified protein, such as a modified natural protein or synthetic protein.

In certain example embodiments, the nanopore protein monomer 2 domain of the nanopore protein conjugate 1 is an alpha-hemolysin monomer. Hence, in such embodiments, the resultant nanopore protein conjugate 1 includes an alpha-hemolysin domain (i.e., the alpha-hemolysin monomer portion of the conjugate), an analyte ligand attachment site 4, and a capture tag 5 (FIG. 1). In certain example embodiments, such nanopore protein conjugates can also include one or more linker regions 3 that join the various domains of the nanopore protein conjugate 1.

As those skilled in the art will appreciate, alpha-hemolysin is a 293-amino acid polypeptide secreted by *Staphylococcus aureus* as a water-soluble monomer that assembles into lipid bilayers to form a heptameric pore. The heptamer, for example, is stable in sodium dodecyl sulfate (SDS) at up to 65° C. Alteration of alpha-hemolysin by mutagenesis or targeted chemical modification, in the central glycine-rich sequence, demonstrate that this part of the molecule penetrates the lipid bilayer and lines the lumen of the transmembrane channel. The channel through the heptamer is a 14-strand β barrel with two strands per subunit contributed by the central stem domain sequence.

In example embodiments where the nanopore monomer 2 is alpha-hemolysin, the alpha-hemolysin domain of the nanopore protein conjugate 1 can be encoded by the nucleic acid sequence set forth as SEQ ID NO: 1 (wild type alpha-hemolysin). In certain example embodiments, the alpha-hemolysin domain of the nanopore protein conjugate 1 can be encoded by a nucleic acid sequence that is 60%, 65%, 70%, 75%, 80%, 85%, 90%, 95%, 96%, 97%, 98%, or 99% identical to the nucleic acid sequence set forth as SEQ ID NO: 1. In certain example embodiments, the alpha-hemolysin domain of the nanopore protein conjugate 1 has the amino acid sequence set forth as SEQ ID NO: 2 or SEQ ID NO: 3. In certain example embodiments, the alpha-hemolysin domain of the nanopore protein conjugate 1 can have an amino acid sequence that is 60%, 65%, 70%, 75%, 80%, 85%, 90%, 95%, 96%, 97%, 98%, or 99% identical to the sequence set forth as SEQ ID NO: 2 or SEQ ID NO: 3.

In example embodiments where the nanopore monomer 2 is alpha-hemolysin, the alpha-hemolysin domain of the nanopore protein conjugate 1 can have the amino acid sequence set forth as SEQ ID NO: 16 (mature, parental wild-type alpha-hemolysin; AAA26598). In certain example embodiments, the alpha-hemolysin domain of the nanopore protein conjugate 1 described herein can have an amino acid sequence that is 60%, 65%, 70%, 75%, 80%, 85%, 90%, 95%, 96%, 97%, 98%, or 99% identical to the sequence set forth as SEQ ID NO: 16. In certain example embodiments, the alpha-hemolysin domain of the nanopore protein conjugate 1 can be specific alpha-hemolysin variant. For example, the alpha-hemolysin variant may have at least 60%, 65%, 70%, 75%, 80%, 85%, 90%, 95%, 96%, 97%, 98%, or 99% or more sequence identity to SEQ ID NO: 16, but include one or more amino acid substitutions.

In certain example embodiments, the nanopore protein monomer 2 portion of the nanopore protein conjugate 1 is an Outer membrane protein G (or "OmpG") monomer. Hence, in such embodiments, the resultant nanopore protein conjugate 1 includes an OmpG domain (i.e., the OmpG monomer portion of the conjugate), an analyte ligand attachment site 4, a capture tag 5, and, in certain example embodiments, one or more linker regions 3. As those skilled in the art will appreciate, OmpG is a 34 kDa porin protein that forms a 14-stranded beta-barrel. The barrel, for example, allows the passive yet selective uptake and secretion of nutrients, ions, and proteins in Gram-negative bacteria. Such porins generally have short turns on the periplasmic side and long loops on the extracellular side. But unlike most porins, OmpG is understood to function as a monomer.

In example embodiments where the nanopore monomer 2 is an OmpG monomer, the OmpG domain of the nanopore protein conjugate 1 can have an amino acid sequence that is 60%, 65%, 70%, 75%, 80%, 85%, 90%, 95%, 96%, 97%, 98%, or 99% identical to the sequence set forth as SEQ ID NO: 6. In certain example embodiments, the OmpG domain of the nanopore protein conjugate 1 can be an OmpG variant. For example, the Ompg variant can have at least 60%, 65%, 70%, 75%, 80%, 85%, 90%, 95%, 96%, 97%, 98%, or 99% or more sequence identity to SEQ ID NO: 6, but include one or more specific amino acid substitutions, thereby forming an OmpG variant.

The capture tag 5 of the nanopore protein conjugate 1 can be any polypeptide sequence that interacts with the pore of a nanopore assembly in such a way that a detectable signal from the nanopore assembly can be identified. For example, a homopolymer of about 30 lysine amino acids, such as about 20, 21, 22, 23, 24, 25, 26, 27, 28, 29, 30, 31, 32, 33, 34, 35, 36, 37, 38, 39, 40 lysine amino acids. In certain example embodiments, the capture tag is an EPPP tag (SEQ ID NO: 17). In certain example embodiments, the capture tag 5 can have the amino acid sequence set forth as SEQ ID NO: 8. In other example embodiments, the capture tag 5 can have an amino acid sequence that is 60%, 65%, 70%, 75%, 80%, 85%, 90%, 95%, 96%, 97%, 98%, or 99% identical to the amino acid sequence set forth as SEQ ID NO: 8.

In certain example embodiments, the nanopore protein conjugate 1 also includes a region for attaching an analyte ligand, such as an analyte attachment domain 4 (FIG. 1). The analyte attachment domain 4 can be located anywhere along the nanopore protein conjugate 1 that does not, for example, interfere with the function of the nanopore assembly as described herein. For example, the analyte attachment domain 4 should not interfere with assembly of the nanopore protein monomer 2 into a nanopore assembly or the interaction of the capture tag 5 with the assembly, as described herein. As shown in FIG. 1, in certain example embodiments the analyte attachment domain 4 can be located between the nanopore protein monomer 2 and the capture tag 5.

In certain example embodiments, the analyte attachment domain 4 can include a SpyTag or SpyCatcher amino acid sequence. See, for example, Li et al, J Mol Biol. 2014 Jan. 23; 426(2): 309-17. For example, the analyte attachment domain 4 can include an amino acid sequence that is at least 80%, 85%, 90%, or 95% identical to the amino acid sequence set forth as SEQ ID NO: 11. In such example embodiments, the SpyTag sequence can be used to attach an analyte ligand, thereby forming an analyte detection complex 9 as described herein (see FIG. 2). In other example embodiments, the analyte ligand attachment site 4 can include other structures or peptide sequences that can be used to attach an analyte ligand to the nanopore protein conjugate. For example, the analyte ligand attachment site 4 can include components of other covalent binding pairs, such as cysteine-maleimide conjugates or azide-alkyne click chemistry pairs, as well as other linkage components known in the art. In certain example embodiments, the analyte attachment domain 4 can include a molecular staple sequence for attaching an analyte ligand to the nanopore protein conjugate 1 (see below).

In certain example embodiments, the nanopore protein conjugate 1 can also include one or more linker regions 3 (FIG. 1). For example, the linker region 3 can be any amino acid sequence that joins the nanopore protein monomer 2 to the other functional regions of the nanopore protein conjugate 1, but that does not interfere with the independent function of the nanopore protein conjugate domains. For example, the linker region 3 does not interfere with the assembly of the nanopore protein monomer 2 into a nanopore protein assembly as described herein. Nor does the linker region 3 interfere with the association of the capture tag 5 with the assembly as described herein or the association of an analyte ligand with the analyte ligand attachment domain.

In certain example embodiments, the linker region 3 can be used to join the nanopore protein monomer 2 to the analyte attachment domain 4 (FIG. 1). In certain example embodiments, the linker region 3 includes 1, 2, 3, 4, 5, 6, 7, 8, 9, 10, 11, 12, 13, 14, 15, 16, 17, 18, 19, or 20 amino acids. In certain example embodiments, the linker region 3 is less than about 15 amino acids, such as about 1-10 amino acids. In certain example embodiments, the linker region 3 is at least 60%, 65%, 70%, 75%, 80%, 85%, 90%, 95%, 96%, 97%, 98%, or 99% identical to the amino acid sequence set forth as any one of SEQ ID NO: 12, SEQ ID NO:13, SEQ ID NO:14, or SEQ ID NO: 15.

In certain example embodiments, the nanopore protein conjugate 1 can include a second linker region (not shown). In such embodiments, the second linker region can join other functional regions of the nanopore protein conjugate 1 together while preserving the functionality of the nanopore protein conjugate 1 as described herein. For example, the second linker region may join the first linker region 3 to the analyte attachment domain 4. Like the first linker region 3, the second linker region (not shown) can include 1, 2, 3, 4, 5, 6, 7, 8, 9, 10, 11, 12, 13, 14, 15, 16, 17, 18, 19, or 20 amino acids. In certain example embodiments, the second linker region is less than about 15 amino acids, such as about 1-10 amino acids. In certain example embodiments, the second linker region is at least 60%, 65%, 70%, 75%, 80%, 85%, 90%, 95%, 96%, 97%, 98%, or 99% identical to the amino acid sequence set forth as any one of SEQ ID NO: 12, SEQ ID NO: 13, SEQ ID NO: 14, or SEQ ID NO: 15. In certain example embodiments, the first linker region 3 and the second linker region can be separated by a non-functional tag, such as a polyhistidine tag.

In certain example embodiments, the nanopore protein conjugate 1 described herein has an amino acid sequence that is 60%, 65%, 70%, 75%, 80%, 85%, 90%, 95%, 96%, 97%, 98%, or 99% identical to the amino acid sequence set forth as SEQ ID NO: 4. In such example embodiments, the nanopore protein conjugate 1 can sequentially include an alpha-hemolysin monomer as the nanopore monomer 2, a linker region 3, a SpyTag sequence as the analyte ligand attachment site 4, a histidine tag, and a capture tag 5 region (see FIG. 1 and SEQ ID NO: 4). For example, the alpha-hemolysin monomer domain of the nanopore protein conjugate 1 can correspond to the amino acid sequence set forth as SEQ ID NO: 16 and the linker region 3 can correspond to the amino acid sequence set forth as SEQ ID NO: 12. Further, the analyte ligand attachment site 4 of the nanopore protein conjugate 1 can correspond to the amino acid sequence set forth as SEQ ID NO: 11 (SpyTag sequence) and the capture tag 5 of the nanopore protein conjugate 1 can correspond to the amino acid sequence set forth as SEQ ID NO: 8.

In certain example embodiments, the nanopore protein conjugate 1 described herein has an amino acid sequence that is 60%, 65%, 70%, 75%, 80%, 85%, 90%, 95%, 96%, 97%, 98%, or 99% identical to the amino acid sequence set forth as SEQ ID NO: 7. In such example embodiments, the nanopore protein conjugate 1 can include an OmpG seqeunce as the nanopore monomer 2, a first linker region 3, a histidine tag, a second linker region, a SpyTag sequence as the analyte ligand attachment site 4, and a capture tag 5 region. For example, the OmpG monomer domain of the nanopore protein conjugate 1 can correspond to the amino acid sequence set forth as SEQ ID NO: 6, the first linker region 3 can correspond to the amino acid sequence set forth as SEQ ID NO: 13, and the second linker region can correspond to the amino acid sequence set forth SEQ ID NO: 14. Further, the analyte ligand attachment site 4 of the nanopore protein conjugate 1 can correspond to the amino acid sequence set forth as SEQ ID NO: 11 (SpyTag sequence) and the capture tag 5 of the nanopore protein conjugate 1 can correspond to the amino acid sequence set forth as SEQ ID NO: 8.

In certain example embodiments, the nanopore protein conjugate 1 described herein can include any number of protein modifications. As those skilled in the art will appreciate, such modifications can include, for example, phosphate (phosphorylation), carbohydrate (glycosylation), ADP-ribosyl (ADP ribosylation), fatty acid (prenylation, which includes but is not limited to: myristoylation and palmitylation), ubiquitin (ubiquitination) and sentrin (sentrinization; a ubiquitination-like protein modification). Additional examples of post-translational modification include methylation, actylation, hydroxylation, iodination and flavin linkage.

In certain example embodiments, the amino acids forming all or a part of nanopore protein conjugate 1 can be stereoisomers. Additionally or alternatively, the amino acids forming all or a part of the nanopore protein conjugate 1 can be modifications of naturally occurring amino acids, non-naturally occurring amino acids, post-translationally modified amino acids, enzymatically synthesized amino acids, derivatized amino acids, constructs or structures designed to mimic amino acids, and the like. The amino acids forming the peptides of nanopore protein conjugate 1 can be one or more of the 20 common amino acids found in naturally occurring proteins, or one or more of the modified and unusual amino acids. In certain example embodiments, the amino acids can be D- or L-amino acids.

In certain example embodiments, the amino acid sequence of the nanopore protein conjugate 1 can also include one or more modified and/or unusual amino acid. Examples of modified and unusual amino acids include but are not limited to, 2-Aminoadipic acid (Aad), 3-Aminoadipic acid (Baad), β-Amino-propionic acid (Bala, β-alanine), 2-Aminobutyric acid (Abu, piperidinic acid), 4-Aminobutyric acid (4Abu), 6-Aminocaproic acid (Acp), 2-Aminoheptanoic acid (Ahe), 2-Aminoisobutyric acid (Aib), 3-Aminoisobutyric acid (Baib), 2-Aminopimelic acid (Apm), 2,4-Diaminobutyric acid (Dbu), Desmosine (Des), 2,2'-Diaminopimelic acid (Dpm), 2,3-Diaminopropionic acid (Dpr), N-Ethylglycine (EtGly), N-Ethylasparagine (EtAsn), Hydroxylysine (Hyl), allo-Hydroxylysine (AHyl), 3-Hydroxyproline (3Hyp), 4-Hydroxyproline (4Hyp), Isodesmosine (Ide), allo-Isoleucine (AIle), N-Methylglycine (MeGly, sarcosine), N-Methylisoleucine (MeIle), 6-N-Methyllysine (MeLys), N-Methylvaline (MeVal), Norvaline (Nva), Norleucine (Nle), and Ornithine (Orn). Other examples of modified and unusual amino acids are described generally in *Synthetic Peptides: A User's Guide*, Second Edition, April 2002, Edited Gregory A. Grant, Oxford University Press; Hruby V J, Al-obeidi F and Kazmierski W: Biochem J 268: 249-262, 1990; and Toniolo C: Int J Peptide Protein Res 35: 287-300, 1990; the teachings of all of which are expressly incorporated herein by reference.

Analyte Detection Complexes

Figure 2:
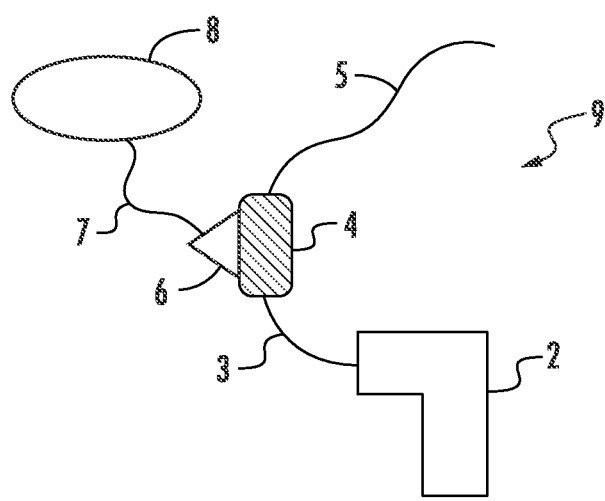
FIG. 2 is an illustration showing an analyte detection complex, in accordance with certain example embodiments.

FIG. 2 is an illustration showing an analyte detection complex 9, in accordance with certain example embodiments. With reference to FIG. 2, a nanopore protein conjugate 1 can be joined to an analyte ligand 8 to form the analyte detection complex 9. For example, the analyte ligand 8 can be joined to the nanopore protein conjugate 1 via the analyte ligand attachment site 4 of the nanopore protein conjugate 1, such as via an attachment member 6. In certain example embodiments, a linker member 7 can be used to indirectly attach the analyte ligand 8 to the analyte ligand attachment site 4 of the nanopore protein conjugate 1.

The analyte ligand 8 of the analyte detection complex 9 can be any ligand that has binding affinity to an analyte, the analyte being any analyte as described herein. For example, the analyte ligand 8 can be an antibody with affinity to a particular antigen, the antigen being the analyte. As those skilled in the art will appreciate in view of this disclosure, any antibody or functional fragment thereof can be used as the analyte ligand. In other example embodiments, the analyte ligand 8 of the analyte detection complex 9 can be used to detect environmental analytes. In certain example embodiments, the analyte ligand 8 of the analyte detection complex 9 can be used to identify protein analytes in complex biological fluid samples, for example, in a tissue and/or a bodily fluid.

In certain example embodiments, the analyte to which the analyte ligand 9 is directed can be present in a variety of sample types, including biological samples, personal care products, pharmaceutical products, water samples, food samples, beverage samples, air samples, nutrient medium samples, clinical samples, and the like. In certain example embodiments, the analyte to which the analyte ligand 9 is directed can be present in a low concentration as compared to other components of the sample. In certain examples embodiments, the analyte ligand 9 can also be used to target subpopulations of macromolecular analytes based on conformation or on functional properties of the analytes. Example analyte ligands 8 include, for example, those defined herein as well as aptamers, antibodies or functional fragments thereof, receptors, and/or peptides that are known to bind to the target analyte. With regard to aptamers, the aptamer can be a nucleic acid aptamer including DNA, RNA, and/or nucleic acid analogs. In certain example embodiments, the aptamer may be a peptide aptamer, such as a peptide aptamer that includes a variable peptide loop attached at both ends to a scaffold. Aptamers can be selected, for example, to bind to a specific target protein analyte.

As those skilled in the art will appreciate, an analyte and analyte ligand 8 represent two members of a binding pair, i.e., two different molecules wherein one of the molecules specifically binds to the second molecule through chemical or physical. In addition to the well-known antigen-antibody binding pair members, other binding pairs include, for example, biotin and avidin, carbohydrates and lectins, complementary nucleotide sequences, complementary peptide sequences, effector and receptor molecules, enzymes cofactors and enzymes, enzyme inhibitors and enzymes, a peptide sequence and an antibody specific for the sequence or the entire protein, polymeric acids and bases, dyes and protein binders, peptides and specific protein binders (e.g., ribonuclease, S-peptide and ribonuclease S-protein), sugar and boronic acid, and similar molecules having an affinity which permits their associations in a binding assay.

Further, analyte ligand/analyte binding pairs can include members that are analogs of the original binding member, e.g., an analyte-analog or binding member made by recombinant techniques or molecular engineering. If the analyte ligand is an immunoreactant it can be, for example, an antibody, antigen, hapten, or complex thereof, and if an antibody is used, it can be a monoclonal or polyclonal antibody, a recombinant protein or antibody, a chimeric antibody, a mixture(s) or fragment(s) thereof, as well as a mixture of an antibody and other binding members. The details of the preparations of such antibodies, peptides and nucleotides and their suitability for use as binding members in a binding assay are well known in the art.

In certain example embodiments, and as illustrated in FIG. 2, the analyte ligand 8 can be joined to the nanopore protein conjugate 1 via an attachment member 6 and a linker member 7. The attachment member 6 can be any protein, nucleic acid sequence, or other entity that can be used to attach the analyte ligand 8, directly or indirectly, to the nanopore protein conjugate 1. In certain example embodiments, the attachment member 6 can be used to form an isopeptide linkage with nanopore protein conjugate. For example, when the analyte ligand attachment site 4 is a SpyCatcher domain or SpyTag domain, the corresponding attachment member 6 can be a SpyTag or SpyCatcher sequence, respectively. Hence, in such example embodiments, the analyte ligand 8 can be tethered to the nanopore protein conjugate 1 via a SpyCatcher/SpyTag isopeptide linkage. In other example embodiments, the attachment member 6 can include components of other covalent binding pairs, such as cysteine-maleimide conjugates or azide-alkyne click chemistry pairs, as well as other linkage components known in the art such as transglutaminase and sortase-mediated attachments.

In example embodiments that include a linker member 7, the linker member 7 can be any structure that joins the analyte ligand 8 to the attachment member 6, but that does not interfere with the function of the analyte detection complex 9 as described herein (FIG. 2). For example, the linker member can be a peptide linker that includes 2, 3, 4, 5, 6, 7, 8, 9, 10, 11, 12, 13, 14, 15, 16, 17, 18, 19, or 20 amino acids. In certain example embodiments, the linker member 7 is less than about 15 amino acids, such as about 1-10 amino acids. In certain example embodiments, the linker member is at least 60%, 65%, 70%, 75%, 80%, 85%, 90%, 95%, 96%, 97%, 98%, or 99% identical to the amino acid sequence set forth as any one of SEQ ID NO: 12, SEQ ID NO:13, SEQ ID NO:14, or SEQ ID NO: 15.

In certain example embodiments, the analyte ligand 8, linker member 7, and attachment member 6 can be arranged sequentially as illustrated in FIG. 2. Additionally or alternatively, the analyte ligand 8, linker 7, and attachment member 6 can be prepared as a single entity and then attached to the analyte attachment domain 4 of the nanopore protein conjugate 1. A genetic fusion of the protein components of analyte ligand 8, linker 7, and attachment member 6 can be made by concatenating the DNA sequences encoding those proteins or peptides into an expression vector, and purifying the resulting protein using methods standard for those skilled in the art.

Nanopore Architecture & Assembly

Figure 3:
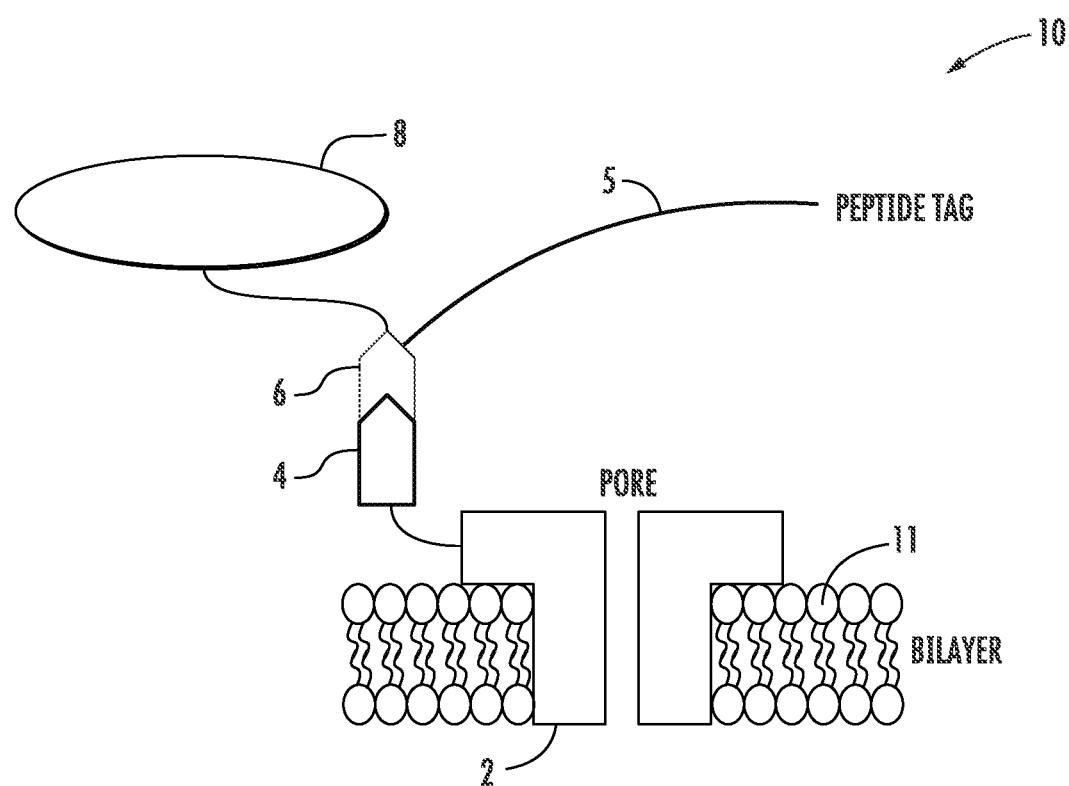
FIG. 3 is an illustration showing a nanopore assembly including an analyte detection complex, in accordance with certain example embodiments.

With reference to FIG. 3, provided is a nanopore assembly 10 that includes an analyte detection complex 9, in accordance with certain example embodiments. The nanopore assembly 10 is typically a multimeric protein structure embedded in a substrate, such as a lipid membrane 11. At least one of the protein subunits of the nanopore assembly 10 includes a nanopore protein conjugate 1, as described herein. By including a nanopore protein conjugate 1 as described herein, an analyte ligand 8 can be attached to the nanopore protein conjugate 1. Further, with the use of the nanopore protein conjugate 1, at least one of the nanopore protein subunits of the nanopore assembly 10 includes a capture tag 5 and a nanopore monomer 2, the nanopore monomer 2 being the portion of the monomeric subunit that interacts with other nanopore subunits to form the multimeric nanopore. The capture tag 5, for example, is available to interact with the pore, and its interaction with the pore can be modified in the presence of an analyte as described herein.

The nanopore protein conjugate 1 of the nanopore assembly 10 can be any of the nanopore protein conjugates 1 described herein. In the case of alpha-hemolysin, for example, the nanopore assembly is an oligomer of seven alpha-hemolysin monomers (i.e., a heptameric nanopore assembly). The monomeric alpha-hemolysin subunits of the heptameric nanopore assembly can be identical copies of the same polypeptide sequence or they can be different alpha-hemolysin polypeptide sequences, so long as at least one of the alpha-hemolysin subunits is associated with a capture tag 5 as described herein. For example, the nanopore assembly can include one nanopore protein conjugate 1 and six alpha-hemolysin monomers that are not linked to a capture tag 5 (for a total of seven oligomerized alpha-hemolysin subunits). In such embodiments, the alpha-hemolysin domain of each of the seven subunits can be the same, or the alpha-hemolysins can be a mixture of alpha-hemolysin monomers and variants thereof In certain example embodiments, the nanopore protein conjugate 1 of the nanopore assembly 10 (i.e., the "one" component of the heptamer) is an amino acid sequence that is 60%, 65%, 70%, 75%, 80%, 85%, 90%, 95%, 96%, 97%, 98%, or 99% or more identical to the sequence set forth as SEQ ID NO: 4. Further, in certain example embodiments, one or more of other nanopore monomers (i.e., one or more of the "six" component of the heptamer) can have an amino acid sequence that is 60%, 65%, 70%, 75%, 80%, 85%, 90%, 95%, 96%, 97%, 98%, or 99% or more identical to the sequence set forth as SEQ ID NO: 5.

The nanopore assembly 2 can be prepared by any method known in the art. For example, the nanopore assembly described herein may be assembled according to the methods described in WO2014/074727, which provides a method for forming multimeric proteins having a defined number of modified subunits (see FIG. 27 of WO2014/074727; see also PCT/EP2017/057433). In certain example embodiments, the nanopore assembly 10 can be formed by mixing a nanopore protein conjugate 1 with nanopore protein monomers. In the case of alpha-hemolysin nanopores, for example, a detergent (e.g., deoxycholic acid) can trigger the alpha-hemolysin monomer to adopt the pore conformation. The nanopores can also be formed, for example, using a lipid (e.g., 1,2-diphytanoyl-sn-glycero-3-phosphocholine (DPhPC) or 1,2-di-0-phytanyl-sn-glycero-3-phosphocholine (DoPhPC)) and moderate temperature (e.g., less than about 100° C.). In some cases, mixing DPhPC with a buffer solution creates large multi-lamellar vesicles (LMV), and adding alpha-hemolysin subunits to this solution and incubating the mixture at 40° C. for 30 minutes results in pore formation.

Because the methods and systems described herein rely on interaction of the capture tag 5 with nanopore assembly 10, it can be beneficial to have only a single capture tag 5 associated with nanopore assembly 10 (rather than multiple capture tags 5). With a non-multimeric nanopore assembly, such as an OmpG assembly, a single nanopore protein conjugate 1 that includes an OmpG nanopore domain can be used to from the a nanopore assembly. In the case of a multimeric nanopore assembly, such as an alpha-hemolysin nanopore assembly, the nanopore assembly 10 can be prepared such that only a single nanopore protein conjugate 1 is included within the assembly (and hence only a single capture tag 5 is present).

In certain example embodiments, the analyte ligand attachment site 4 of the nanopore protein conjugate 1, such as a SpyTag domain, can be used to select for alpha-hemolysin heptamers that include a single nanopore protein conjugate 1 (and hence a single capture tag 5). For example, mixing the nanopore protein conjugate 1 with alpha-hemolysin protein monomers results in heptamers having 0, 1, 2, 3, 4, 5, 6, or 7 nanopore protein conjugates. Yet because of the different number of SpyTag sequences (0, 1, 2, 3, 4, 5, 6, or 7) associated with each heptamer, the heptamers have different charges. Hence, in certain example embodiments, the heptamers can be separated by methods known in the art, such as via elution with cation exchange chromatography. The eluted fractions can then be examined to determine which fraction includes an assembly with a single SpyTag. See PCT/EP2017/057433.

While a variety of methods may be suitable for determining which heptamer fraction contains a single SpyTag (and that is hence capable of binding a only single polymerase/SpyCatcher fusion protein per heptamer), in certain example embodiments the different heptamer fraction can be separated based on molecular weight, such as via SDS-PAGE. A reagent can then be used to confirm the presence of SpyTag associated with each fraction. As described in PCT/EP2017/057433, for example, which is hereby expressly incorporated herein by reference, a SpyCatcher-GFP (green fluorescent protein) can be added to the fractions before separation via SDS-PAGE.

Because heptamers with a fewer number of nanopore protein conjugates (and hence fewer SpyTags) are smaller than the heptamers with greater number of nanopore protein conjugates (and hence more SpyTags), the fraction with a single SpyTag—and hence a single nanopore protein conjugate 1—can be identified, as evidenced by the furthest band migration and the presence of GFP fluorescence in the SDS-PAGE gel corresponding to the band. For example, a fraction containing seven alpha-hemolysin monomers (but no nanopore protein conjugates) will migrate the furthest, but will not fluoresce when mixed with SpyCatcher-GFP because of the absence of the SpyTag bound to the heptamers. But the fraction containing a single SpyTag, however, will both migrate the next furthest (compared to other fluorescent bands) and will fluoresce, thereby facilitating identification of the fraction containing a single nanopore protein conjugate 1 (and hence a single capture tag 5). See PCT/EP2017/057433. In example embodiments where nanopore assemblies having additional capture tags 5 may be desired, such migration-shift analyses can similarly be used to identify alpha-hemolysin nanopore factions with 0, 1, 2, 3, 4, 5, 6, or 7 nanopore protein conjugates 1 (and hence 0, 1, 2, 3, 4, 5, 6, or 7 capture tags 5).

Attachment of Analyte Ligand to Form an Analyte Detection Complex

To prepare a nanopore assembly 10 including an analyte detection complex 9 (FIG. 3), an analyte ligand 8 is attached to the nanopore protein conjugate 1. In certain example embodiments, the analyte ligand 8 can be attached to the nanopore protein conjugate 1 before the nanopore protein conjugate 1 is incorporated into a membrane. In other example embodiments, the analyte ligand 8 can be attached to the nanopore protein conjugate 1 after the nanopore protein conjugate 1 is incorporated into the membrane. For example, when the nanopore assembly 10 includes a porin monomer that does not oligomerize with other monomers, such as an OmpG monomer, the analyte ligand 8 can be attached to the nanopore protein conjugate 1 including the OmpG nanopore protein monomer 2 before the nanopore protein conjugate 1 is incorporated into the lipid membrane or after the nanopore protein conjugate 1 is incorporated into the membrane.

Similarly, when the nanopore assembly 10 is an alpha-hemolysin nanopore, for example, the analyte ligand 8 can be attached to the alpha-hemolysin nanopore protein conjugate 1 before or after the nanopore protein conjugate 1 is incorporated into the multimeric nanopore assembly 10. For example, the alpha-hemolysin heptameric nanopore can be assembled as described herein to include a single nanopore protein conjugate 1 having an alpha-hemolysin nanopore protein monomer 2. The analyte ligand 8 can then be attached to the nanopore protein conjugate 1 after assembly of the alpha-hemolysin heptameric nanopore after the nanopore assembly 10 is assembled, thereby forming a nanopore assembly 10 that includes an analyte detection complex 9 as part of the nanopore. In other example embodiments, the analyte ligand 8 can be attached to the nanopore protein conjugate 1 before formation of the alpha-hemolysin heptameric nanopore assembly. The alpha-hemolysin analyte detection complex 9 can then be mixed with other nanopore protein monomers as described herein to form an alpha-hemolysin nanopore assembly 10.

The analyte ligand 8 can be attached to the nanopore protein conjugate 1 (and hence the nanopore assembly 10) by any method known in the art. In certain example embodiments, attaching the analyte ligand 8 to the nanopore protein conjugate 1 generally involves including a linker sequence or linker molecule as the analyte ligand attachment site 4 of the nanopore protein conjugate 1. An analyte ligand 8 can then be attached to the analyte ligand attachment site 4 via attachment of the attachment ember 6 to the linker sequence of the analyte ligand attachment site 4. For example, the attachment member 6 can be a sequence or other molecule that binds to or interacts with analyte ligand attachment site 4 in such a way to join the analyte ligand 8 to the analyte ligand attachment site 4 of the nanopore protein conjugate 1.

Additionally or alternatively, the analyte ligand 8 can be attached to nanopore protein conjugate 1 with any suitable chemistry (e.g., covalent bond and/or linker). In certain example embodiments, the analyte ligand 8 is attached to the nanopore protein conjugate 1 with molecular staples. In certain example embodiments, molecular staples include three amino acid sequences (denoted linkers A, B and C). Linker A can extend from the nanopore protein conjugate 1, such as from the analyte ligand attachment site 4. Linker B can extend from the analyte ligand 8, such as from the attachment member 6 associated with the analyte ligand 8. And Linker C can then bind Linkers A and B (e.g., by wrapping around both Linkers A and B) and thus joining the analyte ligand 8 to the nanopore protein conjugate 1. Linker C can also be constructed to be part of Linker A or Linker B, thus reducing the number of linker molecules.

In certain example embodiments, the SpyTag/SpyCatcher system, which spontaneously forms covalent isopeptide linkages under physiological conditions, can be used to join the nanopore protein conjugate 1 to the analyte ligand 8. See, for example, Li et al, J Mol Biol. 2014 Jan. 23; 426(2): 309-17. For example, a nanopore protein conjugate 1 can be expressed having a SpyTag domain as the analyte ligand attachment site 4. Further, the analyte ligand 8 to be joined to the nanopore protein conjugate 1 can include a Spy-Catcher domain as the attachment member 6. By mixing the SpyTag/nanopore protein conjugate 1 with the SpyCatcher/analyte ligand 8, the SpyTag and SpyCatcher proteins interact to form nanopore protein conjugate 1 that is linked to analyte ligand 8 via a covalent isopeptide linkage, thereby forming an analyte detection complex 9 as described herein. See, for example, Li et al, J Mol Biol. 2014 Jan. 23; 426(2): 309-17.

Systems & Methods for Detecting an Analyte

By using and relying on a nanopore assembly 10 that includes an analyte detection complex 9 as described herein, in certain example embodiments provided are systems and methods for detecting an analyte in a sample, such as in a fluid sample. To detect an analyte, in certain example embodiments a nanopore assembly 10 including an analyte detection complex 10 is embedded within a membrane and a sensing electrode is positioned adjacent or in proximity to the membrane. For example, the nanopore assembly 10 described herein can be formed or otherwise embedded in a membrane disposed adjacent to a sensing electrode of a sensing circuit, such as an integrated circuit. The integrated circuit can be an application specific integrated circuit (ASIC). In certain example embodiments, the integrated circuit is a field effect transistor or a complementary metal-oxide semiconductor (CMOS). The sensing circuit can be situated in a chip or other device including the nanopore, or off of the chip or device, such as in an off-chip configuration. The semiconductor can be any semiconductor, including, without limitation, Group IV (e.g., silicon) and Group III-V semiconductors (e.g., gallium arsenide). See, for example, WO 2013/123450, for the apparatus and device set-up that can be used in accordance with the compositions and methods described herein, the entire contents of which are hereby expressly incorporated herein by reference.

As those skilled in the art will appreciate, pore based sensors (e.g., biochips) can be used for electro-interrogation analysis of single molecules. A pore based sensor can include a nanopore assembly 10 as described herein that is formed in a membrane that is disposed adjacent or in proximity to a sensing electrode. The sensor can include, for example, a counter electrode. The membrane includes a trans side (i.e., side facing the sensing electrode) and a cis side (i.e., side facing the counter electrode). Hence, a nanopore assembly that is disposed in the membrane can also include a trans side (i.e., side facing the sensing electrode) and a cis side (i.e., side facing the counter electrode). The analyte ligand 8 of the analyte detection complex 9 is positioned, for example, on the cis side of the membrane.

To detect an analyte, the methods, systems, and compositions provided herein rely on measurement and analysis of the capture rate of the capture tag 5 by the nanopore assembly 10. A capture event can be identified using the period-to-period (or p2p) differencing method, as described in WO/2017/220732, titled "Period-to-Period Analysis of AC Signals from Nanopore Sequencing," which is hereby incorporated herein in its entirety. Briefly, capture events are detected when the ADC signal in either the bright or the dark portion of an AC cycle is above a threshold p2p differenced value. The number of capture events in any given sliding window of time gives the capture rate. In cases where the capture tag has a net negative charge, the captures will be in the bright part of the AC cycle, whereas capture tags with a net positive charge will be captured in the dark part of the AC cycle. See WO/2017/220732.

In certain example embodiments, once a nanopore assembly 10 and its associated analyte detection complex 9 are disposed within a membrane (see FIG. 3), a first capture rate of the capture tag 5 can be determined via the sensing electrodes. The first capture rate, for example, corresponds to the capture rate of the capture tag 5 in the presence of a bound analyte ligand 8 alone (i.e., without the presence of an analyte being bound to the analyte ligand). That is, as used herein the first capture rate corresponds to the capture rate of the capture tag 5 by the nanopore assembly 10 before the analyte ligand binds any analyte to which the analyte ligand 8 has a binding affinity. Hence, the first capture rate can be determined before a chip including the nanopore assembly is contacted with a sample including the analyte. In other example embodiments, the first capture rate represents the state of the pore in which an analyte has dissociated from the analyte ligand 8 of the analyte detection complex. Regardless, first capture rate can be indicative of a nanopore assembly 10 including an analyte detection complex 9, where the analyte ligand is in an unbound state (i.e., a ligand is not bound).

In certain example embodiments, the first capture rate can be differentiated from a baseline capture rate, such as to provide an indication that the analyte ligand 8 is bound to the nanopore protein conjugate 1 and hence to the nanopore assembly. For example, in example embodiments where the analyte ligand 8 is joined to the nanopore protein conjugate 1 after formation of the nanopore, the capture rate of the nanopore can be determined before the analyte ligand 8 is joined to the nanopore protein conjugate 1. That is, the capture rate of the nanopore can be determined in the absence of the analyte ligand 8. Thereafter, the analyte ligand 8 can be joined to the nanopore protein conjugate 1 to form the analyte detection complex 9, and the first capture rate can be determined from the nanopore.

Without being bound by any particular theory, it is believed that—with the attachment of the analyte ligand 8 to the nanopore protein conjugate 1 as described herein—the proximity of the analyte ligand 8 to the capture tag 5 alters the interaction of the capture tag 5 with the nanopore. For example, the analyte ligand 8 may sterically hinder the association of the capture tag 5 with the nanopore. Hence, in certain example embodiments, the presence of the analyte ligand 8 may decrease the capture rate of the capture tag 5 by the nanopore assembly 10. In certain example embodiments, the presence of the analyte ligand 8 may increase the capture rate of the capture tag 5 by the nanopore assembly. Regardless, such increases or decreases in the capture rate can be determined, for example, by comparing the first capture rate (i.e., analyte ligand 8 bound to the nanopore protein conjugate 1) to the baseline capture rate (no analyte ligand bound to the nanopore protein conjugate 1). Such a change in capture rate, for example—between the baseline capture rate and the first capture rate—can, in certain example embodiments, provide an indication that the analyte ligand 8 has successfully been bound to the nanopore protein conjugate 1.

In certain example embodiments, the difference between the first capture rate (i.e., analyte ligand 8 bound) and the baseline capture rate (analyte ligand 8 attached but no analyte bound) is believed to be highly variable based on the level of interference with the capture tag 5. In certain example embodiments, the first capture rate may be about 5%, 10%, 15%, 20%, 25%, 30%, 35%, 40%, 45%, 50%, 55%, 60%, 65%, 70%, 75%, 80%, 85%, 90%, 95%, 100%, 105%, 110%, 115%, 120%, 125%, 130%, 135%, 140%, 145%, 150%, 155%, 160%, 165%, 170%, 175%, 180%, 185%, 190%, 195%, 200% or more greater than the baseline capture rate. In certain example embodiments, the first capture rate may be decreased by about 5%, 10%, 15%, 20%, 25%, 30%, 35%, 40%, 45%, 50%, 55%, 60%, 65%, 70%, 75%, 80%, 85%, 90%, 95%, 100%, 105%, 110%, 115%, 120%, 125%, 130%, 135%, 140%, 145%, 150%, 155%, 160%, 165%, 170%, 175%, 180%, 185%, 190%, 195%, or 200% or more as compared to the baseline capture rate.

After determining the first capture rate, the chip containing the nanopore protein assembly 10 and associated analyte detection complex 9 can be contacted with a fluid solution, such as a sample solution to be tested for a target analyte. To test a fluid solution for the presence of the target analyte, the fluid solution can be flowed over a chip including the nanopore assembly 10, thereby contacting the nanopore assembly 10 with the fluid solution. The nanopore assembly 10, for example, is arranged to include at least one analyte detection complex 9 as described herein, with the analyte ligand 8 of the analyte detection complex 9 having a binding affinity to the target analyte. As the fluid is flowed over the nanopore, the target analyte (when present) can interact with the analyte ligand 8, and hence can bind the analyte ligand 8. Conversely, if the target analyte is absent from the fluid solution, no such biding to the analyte ligand 8 can occur. The fluid solution to be tested, for example, can include or consist of any biological fluid, fluid sample, or other sample as described herein that includes (or may include) the target analyte.

Once the nanopore assembly is contacted with the fluid solution, a second capture rate of the capture tag 5 by the nanopore assembly 10 can be determined. The second capture rate can then provide an indication of whether the analyte ligand 8 of the analyte detection complex 9 has bound to a target analyte (or not). Hence, the second capture rate can provide an indication of whether the target analyte is present in the fluid sample that was tested (or not). For example, when the target analyte is bound to the analyte ligand 8, the second capture rate can differ from the first capture rate. In certain example embodiments, when the analyte is bound to the analyte ligand 8, the second capture rate can be increased relative to the first capture rate. In other example embodiments, when the target analyte is bound to the analyte ligand 8, the second capture rate can be decreased relative to the first capture rate. Regardless, a different, second capture rate—as compared to the first capture rate—can provide an indication that the target analyte is bound to the analyte ligand 8 of the nanopore assembly 10 (and hence that the target analyte is present in the fluid solution).

Without wishing to be bound by any particular theory, it is believed that—with the binding of the target analyte to the analyte ligand 8—the proximity of the target analyte/analyte ligand binding pair to the capture tag 5 alters the interaction of the capture tag 5 with the nanopore. For example, the target analyte/analyte ligand binding pair may sterically hinder the association of the capture tag 5 with the nanopore, thereby resulting in a decreased second capture rate (relative to the first capture rate). Alternatively, and again without being bound by any particular theory, in certain example embodiments the binding between the target analyte and the analyte ligand 8 (to form the binding pair) may reduce the steric hindrance imposed by the analyte ligand 8 alone (without the analyte bound), thereby resulting in an increased second capture rate (relative to the first capture rate). Hence, a change in the capture rate—from the first capture rate to the second capture rate—can be used to detect an analyte in a fluid solution.

In certain example embodiments, the difference between the second capture rate (i.e., analyte present and bound) and the first capture rate (analyte ligand 8 attached but no analyte bound) is believed to be highly variable based on the level of interference with the capture tag 5. In certain example embodiments, the second capture rate may be about 5%, 10%, 15%, 20%, 25%, 30%, 35%, 40%, 45%, 50%, 55%, 60%, 65%, 70%, 75%, 80%, 85%, 90%, 95%, 100%, 105%, 110%, 115%, 120%, 125%, 130%, 135%, 140%, 145%, 150%, 155%, 160%, 165%, 170%, 175%, 180%, 185%, 190%, 195%, or 200% or more greater than the first capture rate. In certain example embodiments, the second capture rate may be decreased by about 5%, 10%, 15%, 20%, 25%, 30%, 35%, 40%, 45%, 50%, 55%, 60%, 65%, 70%, 75%, 80%, 85%, 90%, 95%, 100%, 105%, 110%, 115%, 120%, 125%, 130%, 135%, 140%, 145%, 150%, 155%, 160%, 165%, 170%, 175%, 180%, 185%, 190%, 195%, or 200% or more as compared to the first capture rate.

In certain example embodiments, in addition to detecting the analyte, the specific identity of the detected analyte can be determined based on the identity of the analyte ligand 8. For example, if the analyte ligand 8 is a nanobody directed to a specific peptide—and the second capture rate provides an indication that the peptide is present in the sample tested—the identity of the peptide present in the sample can be determined. In other words, any known analyte ligand 8 that is used as described herein to detect an analyte can be used to determine the identity of the analyte.

As those skilled in the art will appreciate based on this disclosure, the methods, systems, and compositions described herein can be used in a variety of practical applications. For example, the methods, systems, and compositions described herein can be used to facilitate screening of a sample for unknown analytes. In such example embodiments, the analyte detection complex 9 could be configured to include a binding domain of a known cellular receptor as the analyte ligand 8. The fluid solution applied to the chip including the nanopore assembly 10 could be one of multiple fractions, for example, with one or more of the fractions containing an analyte, such as a potential agonist or antagonist of the receptor. By testing each fraction as described herein, the fraction(s) that include an analyte to the analyte ligand 8 (i.e., the receptor domain) can be determined.

In certain example embodiments, the methods, compositions, and systems described herein can be used to screen for the presence of multiple different analytes in a single fluid sample on a single chip. As those skilled in the art will appreciate, current chip technology permits the deposition of hundreds of thousands of nanopores (or more) on a single chip. Hence, by using the methods and compositions described herein, multiple different nanopore assemblies 10—each including an analyte detection complex—can be used on the same chip to test a fluid sample for multiple different analytes. For example, individual sets of nanopore assemblies 10 can be assembled as described herein, with each set being arranged to detect a different analyte.

In such example embodiments, one set of nanopore assemblies 10 can include an analyte ligand 8 to analyte A, while another set of nanopore assemblies 10 can include analyte ligand 8 to analyte B. Multiple other nanopore assemblies 10 could be disposed on the same chip as well, such as those directed to analytes C, D, E, F, and so on, such that the chip can detect multiple different analytes. In certain example embodiments, a baseline capture rate can be determined for each nanopore assembly, and the baseline capture rate can be compared to a first capture rate as described herein to provide an indication that an analyte ligand 8 is joined to the nanopore protein conjugate 1 as described herein.

Additionally or alternatively, a single fluid sample can be placed into contact with the chip (and hence the multiple different nanopore assemblies) as described herein. Then, for each of the nanopore assemblies 10, a second capture rate can be determined and compared to the first capture rate as described herein, thus permitting detection of a different analyte ligand for each different set of nanopore assemblies 10. For each pore, the second capture rate can then provide an indication of whether the target analyte—to which the analyte ligand 8 of the pore is directed—is present in the sample. Hence, multiple pores can be used to detect multiple different analytes.

To differentiate among the different nanopore assemblies disposed on the chip, a variety of techniques can be used and are available. For example, different capture tags 5 can be used for different groups of nanopore assemblies, such that different baseline capture rates can be used to identify the different nanopore assemblies 10. For example, a capture tag 5 with a known baseline capture rate can be used with one set of nanopore assemblies 10 directed to analyte A, while a different capture tag 5 with a different baseline capture rate can be used with a set of nanopore assemblies 10 directed to analyte B. The two different populations of nanopores can then be differentiated by the different baseline capture rates.

Additionally or alternatively, different pore types, such as pores with smaller or larger pore sizes, can be used and readily differentiated based on techniques known in the art. With such configurations, for example, a nanopore with a larger opening can provide a larger current signal than a pore with a smaller opening, thus permitting differentiation of the pores on the same chip. The different pores can then be correlated with the analytes they are configured to detect, thus permitting identification of different analytes on the same chip. Other methods of differentiation include the blockade level of the capture tag, the rate of capture tag capture in the absence of analyte as described herein, and the current-voltage profiles of the nanopores.

In other example embodiments, one or more different capture tags can be located on the tans side of the nanopore, thereby providing an additional way in which sets of different pores can be differentiated on the same chip. In such examples, a second capture tag can be attached to the trans-side of the nanopore, resulting in a blockade during the dark portion of the AC cycle. These dark-side captures may also be distinguished from one-another by the rate of capture and the level of captured tag. See WO/2017/220732.

FIGS. 4A-4C are illustrations showing the various states of the nanopore assembly that are associated with the baseline capture rate, first capture rate, and second capture rate, in accordance with certain example embodiments. As shown in FIG. 4A, the nanopore assembly includes a nanopore protein conjugate 1 (as described in FIG. 1), along with a capture tag (i.e., the peptide tag 5, as illustrated). The dashed line illustrates the interaction of the peptide tag with the pore of the nanopore, which results in a detectable baseline capture rate. As shown, the analyte ligand (e.g., a nanobody) is not yet joined to the nanopore assembly (FIG. 4A). As shown in FIG. 4B, the nanopore assembly includes a nanopore protein conjugate 1 (as described in FIG. 1) along with an attached nanobody 8. Hence, the nanopore assembly includes an analyte detection complex as described herein. Also shown is the capture tag (i.e., the peptide tag 5), with the dashed line showing the interaction of the capture tag with the nanopore, thereby resulting in a detectable first capture rate (FIG. 4B). As shown in FIG. 4C, an analyte (e.g., an antigen) has now bound to the analyte ligand (e.g., the nanobody 8) of the analyte detection complex, which results in a detectable second capture rate of the capture tag (i.e., capture of the peptide tag, as illustrated).

Methods for Determining Analyte Concentration

In addition to detecting and identifying an analyte, the methods, systems, and compositions described herein can be used for determining the concentration of an analyte in a fluid solution. For example, because the first capture rate and the second capture rates correspond to a given nanopore transitioning from an unbound state to an analyte-bound state, respectively, the change in the capture rate from the first capture rate—to the second capture rate—and back to the first capture rate can be used to determine an association/dissociation rates between the analyte ligand and the analyte. The association/dissociation rates, along with known binding characteristics between the analyte ligand and the analyte, can then be used in conjunction with known kinetic methods to determine concentration information for the analyte in the sample.

To determine the concentration of an analyte, the method for detecting the presence of an analyte as described herein can be performed, with the association/dissociation rates between the analyte/ligand pair being determined from the first and second capture rate transitions. For example, a nanopore assembly 10 including an analyte detection complex 9 as described herein is disposed within a membrane of a chip. One or more sensing electrodes is then placed in proximity to the nanopore assembly 10 including the analyte detection complex 9. A first capture rate is then determined for the nanopore assembly 10 as described herein, the first capture rate corresponding to a pore state in which the analyte ligand 8 is bound to the nanopore protein conjugate 1 of the nanopore assembly 10 in the absence of a bound analyte.

Thereafter, the chip (and hence the nanopore assembly 10 disposed thereon) can be contacted with a fluid sample, such as a sample including the analyte ligand, and the capture rate continuously monitored. Contacting the nanopore assembly 10 with the analyte allows binding of the analyte to the analyte ligand 8, and hence allows identification of the transition between the first capture rate to the second capture rate as described herein. The second capture rate, for example, corresponds to a pore state in which the analyte is now bound to the analyte ligand, as described herein.

Following identification of the transition between the first capture rate to the second capture rate, continued measurement of the second capture rate allows for identification a second transition, i.e., the timepoint where the second capture rate transitions back to (or approximately to) the first capture rate. That is, with continued measurement of the capture rate, a return to (or approximately to) the first capture rate can be identified, the return to the first capture rate corresponding to a pore state in which the analyte and analyte ligand 8 has become unbound. In other words, the second transition back to (or approximately to) the first capture rate from the second capture rate corresponds to the dissociation of the analyte-ligand binding pair.

In certain example embodiments, the time spent in the bound state for the analyte-ligand pair can be determined by measuring the time interval between the first transition and the second transition. Likewise, in certain example embodiments the time the analyte-ligand pair spends in the unbound state can be determined by measuring the length of the transition from the first capture rate back to the second capture rate in the presence of the analyte. The association/dissociation rates between the analyte and analyte ligand 8 for the binding reaction can then be determined from the identified capture rate transitions, and in particular from the length of time the nanopore is in the bound vs. unbound states. For example, to determine the association rate ($K_a$) the individual intercapture times for a given binding reaction can be recorded and fit to an equation describing the binding reaction. The equation, for example, can be a single exponential equation or another type of equation, depending on the binding mechanism between the analyte and the analyte ligand 8 (e.g., a protein-protein interaction, preotin-DNA interaction, DNA-DNA interaction, aptamer-DNA interaction, protein-chemical, etc.). To determine the dissociation rate ($K_d$) for the binding reaction, the binding dwell times and the durations of each binding event, are collected, recorded and fit to an equation describing the dissociation reaction. This may be a single exponential equation or another type of equation depending on the dissociation mechanism associated with the binding reaction.

Once the association and/or dissociation rates are determined for a particular binding reaction, the $K_a$ and $K_d$—along known kinetic methods and principals—can be used to back-calculate the concentration of the analyte. For example, where the nanopore concentration of the chip, the antigen-ligand (i.e., analyte-pore) concentration, and the $K_a/K_d$ are known, the concentration of the analyte can be readily determined from the following kinetic equation:

$$[\text{Analyte}] + [\text{Pore}] \underset{k_a}{\overset{k_d}{\rightleftharpoons}} [\text{analyte-ligand}]$$

where, ka/kd=([Analyte]*[Pore])/[Analyte−Ligand]. The concentration of free analyte can be determine by: [Analyte] =(ka/kd)*[Analyte−Pore]/[Pore]. Hence, the total concentration of analyte is [Analyte−Pore]+[Analyte]. The various parameters, i.e., $K_a$, $k_d$, [pore], and [pore−analyte] can all measured on the chip as described herein. For example, the analyte-ligand concentration can be determined based on the number of pores that are identified as binding the analyte. An example of the transition from the first capture rate, to the second capture rate, and then back to (or approximately to) the first capture rate is shown, for example, in FIG. 5C (discussed below).

As those skilled in the art will appreciate based on this disclosure, the nanopore assembly described herein can have other arrangements that can be compatible with the methods and systems described herein (for both analyte detection and concentration determination). For example, in certain example embodiments, the capture tag described herein can be attached, directly or indirectly, to the analyte ligand. In such embodiments, a nanopore assembly can be configured to include a nanopore protein conjugate in which the conjugate protein includes a nanopore protein monomer and an analyte ligand attachment site. An analyte ligand that includes a capture tag can then be attached to the analyte ligand attachment site, thereby forming an analyte detection complex in which the capture tag is attached to the analyte ligand, directly or indirectly, rather than to the nanopore protein conjugate. In certain example embodiments, the analyte ligand with the capture tag can be attached to the analyte ligand attachment site of the conjugate protein after the nanopore is formed within a lipid membrane. In other example embodiments, the analyte ligand with the capture tag can be joined to the attachment site of the conjugate protein before the complex is incorporated into the lipid membrane.

In other example embodiments, a nanopore protein conjugate including a nanopore protein monomer and a capture tag can be combined with at least one other nanopore monomer that includes an analyte ligand. For example, an alpha-hemolysin nanopore can be formed in which the one-component is a nanopore conjugate including a capture tag and in which one of the other six alpha-hemolysin monomers includes the analyte ligand. Hence, the alpha-hemolysin nanopore assembly would be a 1:6 heptamer with a single capture tag and a single analyte ligand. In other example embodiments, the analyte ligand can be attached to 1, 2, 3, 4, 5, or 6 of the alpha-hemolysin monomers of the heptamer, with the remaining alpha-hemolysin monomer including the capture tag. In other example embodiments, the capture tag can be placed on multiple of the alpha-hemolysin monomers while one or more other of the monomers of the heptamer include the analyte ligand. Such nanopores can be identified, for example, as described herein using migration shift analyses.

EXAMPLES

The present invention is described in further detain in the following examples which are not in any way intended to limit the scope of the invention as claimed. The attached Figures are meant to be considered as integral parts of the specification and description of the invention.

All references cited are herein specifically incorporated by reference for all that is described therein. The following examples are offered to illustrate, but not to limit the claimed invention.

As used herein, the following abbreviations apply: eq (equivalents); M (Molar); µM (micromolar); N (Normal); mol (moles); mmol (millimoles); µmol (micromoles); nmol (nanomoles); g (grams); mg (milligrams); kg (kilograms); µg (micrograms); L (liters); ml (milliliters); µl (microliters); cm (centimeters); mm (millimeters); µm (micrometers); nm (nanometers); ° C. (degrees Centigrade); h (hours); min (minutes); sec (seconds); msec (milliseconds).

Example 1

Protein Expression and Recovery

This example illustrates the expression and recovery of protein from bacterial host cells, e.g., *E. coli*. More particularly, this example describes the expression and recovery of an α-HL nanopore protein conjugate (α-HL-subunit/SpyTag/CaptureTag sequence, SEQ ID NO: 4), an α-HL subunit variant (SEQ ID NO: 5), a GFP analyte ligand having a SpyCatcher sequence (SEQ ID NO: 9), and a GFP analyte (SEQ ID NO: 10).

Preparation of α-HL Nanopore Protein Conjugate (SEQ ID NO: 4)

An α-HL-subunit/SpyTag/CaptureTag protein (SEQ ID NO: 4) was prepared as the nanopore protein conjugate, with the capture tag domain of the conjugate corresponding to the sequence set forth as SEQ ID NO: 8 and the α-HL monomer of the conjugate corresponding to SEQ ID NO: 16. To prepare the α-HL-subunit/SpyTag/CaptureTag protein (SEQ ID NO: 4), the gene encoding the α-HL-subunit/SpyTag/CaptureTag protein sequence (SEQ ID NO: 4) was synthesized by commercial DNA synthesis and inserted into a pET26b vector using standard DNA restriction enzyme digestion and ligation. Plasmid DNA was transformed into BL21(DE3) *E. coli* competent cells using standard heat-shock protocols and grown on LB agar plates supplemented with Kanamycin. Bacterial colonies were selected and sequenced to verify the integrity of the gene. Bacterial cultures were started from glycerol stocks and grown overnight in 5 mL cultures of LB media supplemented with the appropriate antibiotic. These cultures were then expanded in autoinduction MagicMedia (Invitrogen) supplemented with antibiotics and allowed to expand at 25 C for 16-24 hours. Cell pellets were harvested using centrifugation at 2,200×g for 15 minutes and frozen at −80 C until further use.

Following expression of the α-HL-subunit/SpyTag/CaptureTag (SEQ ID NO: 4), the pellets were thawed and solubilized in 5 mL of lysis buffer (50 mM Tris-HCl, pH 8.0, 300 mM NaCl, 100 mM KPO4, 10 mM Imidazole) for every gram of cell pellet and supplemented with EDTA-free protease inhibitor tablets and DNaseI (Sigma-Aldrich™). Cells were lysed using a tip sonicator (Fisher Scientific™) set to 90% max power and pulsed for 1 second on, 4 seconds off for two minutes. Cell debris was removed using centrifugation at 20,000×g for 45 minutes. The supernatant was applied to a cobalt affinity column and washed with 2 CV of lysis buffer, 2 CV of wash buffer (50 mM Tris-HCl, pH 8.0, 500 mM NaCl, 10 mM Imidazole), 10 CV of high salt wash buffer (50 mM Tris-HCl, pH 8.0, 1 M NaCl, 10 mM Imidazole), 2 CV of wash buffer, and eluted using wash buffer supplemented with 150 mM imidazole.

Preparation of α-HL Subunit Variant (SEQ ID NO: 5)

The α-HL subunit variant (SEQ ID NO: 5) is used as the six component to form a 1:6 α-HL heptamer (as described in Example 2). Briefly, to prepare the α-HL subunit variant (SEQ ID NO: 5), the gene encoding α-HL variant protein subunit listed in SEQ ID NO: 5 was synthesized by commercial DNA synthesis and inserted into a pET26b vector using standard DNA restriction enzyme digestion and ligation. Plasmid DNA was transformed into BL21(DE3) *E. coli* competent cells using standard heat-shock protocols and grown on LB agar plates supplemented with Kanamycin. Bacterial colonies were selected and sequenced to verify the integrity of the gene. Bacterial cultures were started from glycerol stocks and grown overnight in 5 mL cultures of LB media supplemented with the appropriate antibiotic. These cultures were then expanded in autoinduction MagicMedia (Invitrogen) supplemented with antibiotics and allowed to expand at 25 C for 16-24 hours. Cell pellets were harvested using centrifugation at 2,200×g for 15 minutes and frozen at −80 C until further use.

Following expression of the α-HL protein (SEQ ID NO: 5), pellets were thawed and solubilized in 5 mL of lysis buffer (50 mM Tris-HCl, pH 8.0, 300 mM NaCl, 100 mM KPO4, 10 mM Imidazole) for every gram of cell pellet and supplemented with EDTA-free protease inhibitor tablets and DNaseI (Sigma-Aldrich™). Cells were lysed using a tip sonicator (Fisher Scientific™) set to 90% max power and pulsed for 1 second on, 4 seconds off for two minutes. Cell debris was removed using centrifugation at 20,000×g for 45 minutes. The supernatant was applied to a cobalt affinity column and washed with 2 CV of lysis buffer, 2 CV of wash buffer (50 mM Tris-HCl, pH 8.0, 500 mM NaCl, 10 mM Imidazole), 10 CV of high salt wash buffer (50 mM Tris- HCl, pH 8.0, 1 M NaCl, 10 mM Imidazole), 2 CV of wash buffer, and eluted using wash buffer supplemented with 150 mM imidazole.

Preparation of GFP Analyte Ligand (SEQ ID NO: 9)

The GFP analyte ligand is used to form an analyte detection complex, with analyte ligand of the analyte detection complex be anti-GFP. To prepare the GFP analyte ligand, the gene encoding a GFP-analyte-ligand/SpyCatcher fusion protein (SEQ ID NO: 9) was synthesized by commercial DNA synthesis and inserted into a pET26b vector using standard DNA restriction enzyme digestion and ligation. Plasmid DNA was transformed into BL21(DE3) E. coli competent cells using standard heat-shock protocols and grown on LB agar plates supplemented with Kanamycin. Bacterial colonies were selected and sequenced to verify the integrity of the gene. Bacterial cultures were started from glycerol stocks and grown overnight in 5 mL cultures of LB media supplemented with the appropriate antibiotic. These cultures were then expanded in autoinduction MagicMedia (Invitrogen) supplemented with antibiotics and allowed to expand at 25 C for 16-24 hours. Cell pellets were harvested using centrifugation at 2,200×g for 15 minutes and frozen at −80 C until further use.

Following expression of the GFP-analyte-ligand/Spy-Catcher protein (SEQ ID NO: 9), pellets were thawed and solubilized in 5 mL of lysis buffer (50 mM Tris-HCl, pH 8.0, 300 mM NaCl, 100 mM KPO4, 10 mM Imidazole) for every gram of cell pellet and supplemented with EDTA-free protease inhibitor tablets and DNaseI (Sigma-Aldrich™). Cells were lysed using a tip sonicator (Fisher Scientific™) set to 90% max power and pulsed for 1 second on, 4 seconds off for two minutes. Cell debris was removed using centrifugation at 20,000×g for 45 minutes. The supernatant was applied to a cobalt affinity column and washed with 2 CV of lysis buffer, 2 CV of wash buffer (50 mM Tris-HCl, pH 8.0, 500 mM NaCl, 10 mM Imidazole), 10 CV of high salt wash buffer (50 mM Tris-HCl, pH 8.0, 1 M NaCl, 10 mM Imidazole), 2 CV of wash buffer, and eluted using wash buffer supplemented with 150 mM imidazole.

GFP Analyte (SEQ ID NO: 10)

The GFP analyte (SEQ ID NO: 10) is used in conjunction with the analyte detection complex to demonstrate the activity of an α-HL nanopore including an analyte detection complex (see Example 3). To prepare the GFP analyte (SEQ ID NO: 10), the gene encoding the GFP analyte listed in SEQ ID NO: 10 was synthesized by commercial DNA synthesis and inserted into a pET26b vector using standard DNA restriction enzyme digestion and ligation. Plasmid DNA was transformed into BL21(DE3) E. coli competent cells using standard heat-shock protocols and grown on LB agar plates supplemented with Kanamycin. Bacterial colonies were selected and sequenced to verify the integrity of the gene. Bacterial cultures were started from glycerol stocks and grown overnight in 5 mL cultures of LB media supplemented with the appropriate antibiotic. These cultures were then expanded in autoinduction MagicMedia (Invitrogen) supplemented with antibiotics and allowed to expand at 25 C for 16-24 hours. Cell pellets were harvested using centrifugation at 2,200×g for 15 minutes and frozen at −80 C until further use.

Following expression of the GFP analyte (SEQ ID NO: 10), pellets were thawed and solubilized in 5 mL of lysis buffer (50 mM Tris-HCl, pH 8.0, 300 mM NaCl, 100 mM KPO4, 10 mM Imidazole) for every gram of cell pellet and supplemented with EDTA-free protease inhibitor tablets and DNaseI (Sigma-Aldrich™). Cells were lysed using a tip sonicator (Fisher Scientific™) set to 90% max power and pulsed for 1 second on, 4 seconds off for two minutes. Cell debris was removed using centrifugation at 20,000×g for 45 minutes. The supernatant was applied to a cobalt affinity column and washed with 2 CV of lysis buffer, 2 CV of wash buffer (50 mM Tris-HCl, pH 8.0, 500 mM NaCl, 10 mM Imidazole), 10 CV of high salt wash buffer (50 mM Tris-HCl, pH 8.0, 1 M NaCl, 10 mM Imidazole), 2 CV of wash buffer, and eluted using wash buffer supplemented with 150 mM imidazole. Protein was aliquoted and stored at -80C until immediately prior to use.

Example 2

Assembly of Nanopore Including Analyte Detection Complex

This example describes the assembly of a heptameric nanopore having six α-HL variant nanopore monomer subunits (SEQ ID NO: 5) and one α-HL subunit comprising a Capture Tag sequence and a SpyTag sequence (SEQ ID NO: 4), where the GFP analyte ligand (SEQ ID NO: 9) is attached to the single α-HL subunit (SEQ ID NO: 4) via a SpyTag-SpyCatcher linkage to form an analyte detection complex. The SpyTag-SpyCatcher linkage, for example, is described in Li et al, J Mol Biol. 2014 Jan. 23; 426(2): 309-17.

Preparation of 1:6 α-HL Heptameric Nanopore Assembly

An α-HL heptameric nanopore assembly including one α-HL/SpyTag (SEQ ID No: 4) and 6 α-HL-variant protein (SEQ ID NO: 5) (i.e., a 1:6 heptamer ratio) can be prepared generally as described in PCT/EP2017/057433. Briefly, using approximately 20 mg of total protein, the α-HL/SpyTag (SEQ ID No: 4) to desired α-HL-variant protein (SEQ ID NO: 5) solutions were mixed together at a 1:9 ratio to form a mixture of heptamers. It is expected that such a mixture will result in various fractions that include varying ratios of α-HL/SpyTag (SEQ ID NO: 4) and α-HL-variant protein (SEQ ID NO: 5) (i.e., 0:7; 1:6, 2:5, 3:4, etc.), where the α-HL/SpyTag (SEQ ID NO: 4) SpyTag component is present as 0, 1, 2, 3, 4, 5, 6, or 7 monomeric subunits of the heptamer.

Diphytanoylphosphatidylcholine (DPhPC) lipid was solubilized in either 50 mM Tris, 200 mM NaCl, pH 8 or 150 mM KCl, 30 mM HEPES, pH 7.5 to a final concentration of 50 mg/ml and added to the mixture of α-HL monomers to a final concentration of 5 mg/ml. The mixture of the α-HL monomers was incubated at 37° C. for at least 60 min. Thereafter, n-Octyl-β-D-Glucopyranoside (βOG) was added to a final concentration of 5% (weight/volume) to solubilize the resulting lipid-protein mixture. The sample was centrifuged to clear protein aggregates and left-over lipid complexes and the supernatant was collected for further purification.

The mixture of heptamers was then subjected to cation exchange purification and the elution fractions collected. For each fraction, two samples were prepared for SDS-PAGE. The first sample included 15 uL of α-HL eluate alone and the second sample was combined with 3 ug of GFP-SpyCatcher (SEQ ID NO: 10). The samples were then incubated (and sheltered from light) at room temperature for 1-16 hours.

Following incubation, 5 uL of 4× Laemmli SDS-PAGE buffer (Bio-Rad™) was added to each sample. The samples and a PrecisionPlus Stain-Free protein ladder were then loaded onto a 4-20% Mini-PROTEAN Stain-Free protein precast gel (Bio-Rad). The gels were ran at 200 mV for 30 minutes. The gels were then imaged using a Stain-Free filter.

The attachment of the GFP-SpyCatcher (SEQ ID NO: 10) to the α-HL/SpyTag protein (SEQ ID NO: 4) of the heptameric nanopore assembly can be observed through molecular weight band shifts during SDS-PAGE, thus facilitating the identification of the 1:6 heptamer fraction. That is, heptamers containing a single SpyTag will bind a single GFP-SpyCatcher (SEQ ID NO: 10) molecule and will thus have a shift that corresponds to the molecular weight of the heptameric pore plus the molecular weight of a single GFP-SpyCatcher (SEQ ID NO: 10) molecule, while heptamers with two or more SpyTags should have correspondingly larger molecular weight shifts. Therefore, the peaks eluted off of the cation exchange column during heptameric α-HL purification above can be analyzed for the ratio of α-HL/SpyTag to α-HL-variant. In addition, the presence of GFP-SpyCatcher (SEQ ID NO: 10) attachment can be observed using a GFP-fluorescence filter when imaging the SDS-PAGE gels. See PCT/EP2017/057433.

Based on this rationale, the fraction whose molecular weight shift corresponded to a single addition of GFP-SpyCatcher (SEQ ID NO: 10), and hence a 1-component nanopore protein conjugate (SEQ ID NO: 4) to six α-HL variants (SEQ ID NO: 5), was determined using a molecular weight standard protein ladder. Bio-Rad's stain-free imaging system was used to determine the molecular weight shift. The presence of GFP fluorescence was determined using a blue filter. The presence of fluorescence was used to confirm the presence of the SpyTag protein. See PCT/EP2017/057433. The elution fraction corresponding to the 1:6 ratio, i.e., one α-HL/SpyTag (SEQ ID NO: 4) to six α-HL-variants (SEQ ID NO: 5), was then used for further experiments.

Attachment of GFP Analyte Ligand (SEQ ID NO: 9) to 1:6 Heptamers

Using the 1:6 heptamer fraction from above, the GFP analyte ligand (SEQ ID NO: 9) (i.e., the anti-GFP nanobody including a SpyCatcher seqeunce) was then attached to the one α-HL/SpyTag/CapTag (SEQ ID NO: 4) component of the 1:6 heptamer using the SpyTag/SpyCatcher system (see Li et al, J Mol Biol. 2014 Jan. 23; 426(2): 309-17 9), thereby forming an analyte detection complex within the nanopore assembly. Briefly, to attach the sticky GFP analyte ligand (SEQ ID NO: 9) to the one α-HL/SpyTag (SEQ ID NO: 4) component of the 1:6 heptamer, the sticky GFP analyte ligand (SEQ ID NO: 9) was mixed with the 1:6 heptamer complex (see above) at 4° C. overnight. Unattached GFP analyte ligand (SEQ ID NO: 9) was separated from the complex by applying the mixture to a size exclusion chromatography column. Resulting fractions containing the complex were aliquoted and stored at −80C prior to use. The heptamer including GFP analyte ligand was then used in subsequent experiments, with the GFP analyte ligand (SEQ ID NO: 9) attached to α-HL/SpyTag/CapTag (SEQ ID NO: 4) forming the analyte detection complex of the nanopore assembly.

Example 3

Capture Rate Determination & Analysis

This example shows the capture rate determination and analysis for a nanopore assembly without an attached analyte ligand, with the analyte ligand attached (i.e., the nanopore described in Example 2, above), and in the presence of the GFP analyte (SEQ ID NO: 10).

Briefly, 1:6 alpha-hemolysin heptamers without the analyte ligand attached were prepared and disposed on a chip as described in U.S. Patent Pub. 2017/0322195, titled "Systems and methods for forming a nanopore in a lipid bilayer," which is hereby incorporated herein in its entirety.

Following preparation of the chip, the Capture Rate Analysis Method was then used to assess the capture rate of the capture tag under different conditions (i.e., without the GFP analyte ligand bound to the pore, with the GFP analyte ligand bound to the pore, and in the presence of the GFP analyte). Briefly, the Capture Rate Analysis Method is based on Period-to-Period Differences Method, which is described in detail in WO/2017/220732. The capture rate can be measured by first detecting all the Tag-capture events by the pore. The capture events are detected in the signal by subtracting the signal that shifted right by one period from the original. The difference signal is further processed by setting difference values below the ADC noise threshold to zero. The time-stamps of each of the capture events are recorded.

Figure 5A:
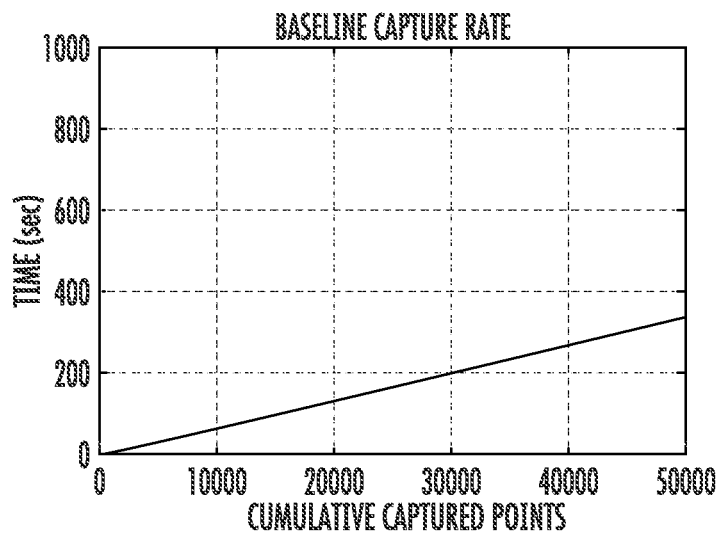
FIGS. 5A-5C are graphs showing various capture rates as those rates correspond to a binding state of the nanopore assembly, in accordance with certain example embodiments. More particularly.
Figure 5B:
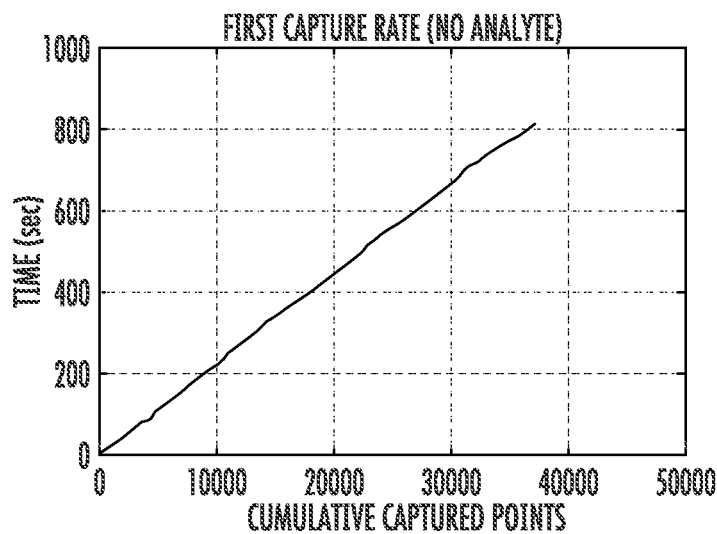
Figure 5C:
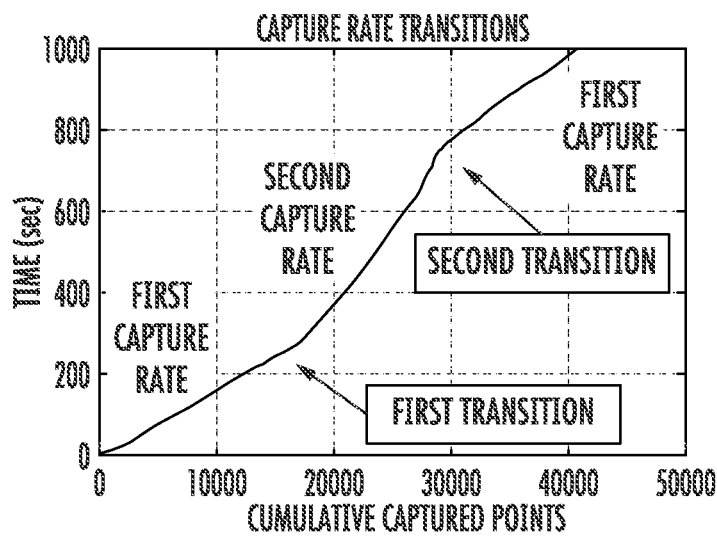

FIG. 5A-5C are graphs showing capture rate determinations, in accordance with certain example embodiments. Each point in FIGS. 5A-5C, for example, represents a capture event number versus the measured time-stamp of the event. The capture rate is the inverse of the slope of the plot of all events. More particularly, FIG. 5A shows the baseline capture rate for Tag captures with a single global slope, in the absence of the GFP analyte ligand (i.e., no ligand bound). For the data shown in FIG. 5B, the GFP analyte ligand was attached to the nanopore as described in Example 2, above, and the first capture rate was determined. As shown in FIG. 5B, the first capture rate was reduced as compared to the baseline capture rate (FIG. 5A) when the GFP analyte ligand was attached to the nanopore.

Following determination of the baseline capture rate (FIG. 5A) and the first capture rate (FIG. 5B), the second capture rate corresponding to the binding of the GFP analyte ligand was determined as shown in FIG. 5C. Briefly, 27 µL of GFP analyte (SEQ ID NO: 10) was added to the chip, thus facilitating binding of the between the GFP analyte (SEQ ID NO: 10) and the GFP analyte ligand of the nanopore. As shown in FIG. 5C, the second capture rate is less than the first capture rate. Further, the transition from where the GFP analyte ligand attaches to the GFP analyte (at about 300 sec) and then dissociates (before 800 sec) can be observed (FIG. 5C). Based on the identification of a second capture rate that is different than the first capture rate (FIG. 5C), the presence of the GFP analyte (SEQ ID NO: 10) one the chip can be confirmed.

---

SEQUENCE LISTING FREE TEXT

```
SEQ ID NO: 1 (WT a-HL DNA)
ATGGCAGATC TCGATCCCGC GAAATTAATA CGACTCACTA TAGGGAGGCC         50

ACAACGGTTT CCCTCTAGAA ATAATTTTGT TAACTTTAA GAAGGAGATA         100
```

| SEQUENCE LISTING FREE TEXT |
|---|

```
TACAAATGGA TTCAGATATT AATATTAAAA CAGGTACAAC AGATATTGGT      150

TCAAATACAA CAGTAAAAAC TGGTGATTTA GTAACTTATG ATAAAGAAAA      200

TGGTATGCAT AAAAAAGTAT TTTATTCTTT TATTGATGAT AAAAATCATA      250

ATAAAAAATT GTTAGTTATT CGTACAAAAG GTACTATTGC AGGTCAATAT      300

AGAGTATATA GTGAAGAAGG TGCTAATAAA AGTGGTTTAG CATGGCCATC      350

TGCTTTTAAA GTTCAATTAC AATTACCTGA TAATGAAGTA GCACAAATTT      400

CAGATTATTA TCCACGTAAT AGTATTGATA CAAAAGAATA TATGTCAACA      450

TTAACTTATG GTTTTAATGG TAATGTAACA GGTGATGATA CTGGTAAAAT      500

TGGTGGTTTA ATTGGTGCTA ATGTTTCAAT TGGTCATACA TTAAAATATG      550

TACAACCAGA TTTTAAAACA ATTTTAGAAA GTCCTACTGA TAAAAAAGTT      600

GGTTGGAAAG TAATTTTTAA TAATATGGTT AATCAAAATT GGGGTCCTTA      650

TGATCGTGAT AGTTGGAATC CTGTATATGG TAATCAATTA TTTATGAAAA      700

CAAGAAATGG TTCTATGAAA GCAGCTGATA ATTTCTTAGA TCCAAATAAA      750

GCATCAAGTT TATTATCTTC AGGTTTTTCT CCTGATTTTG CAACAGTTAT      800

TACTATGGAT AGAAAAGCAT CAAAACAACA AACAAATATT GATGTTATTT      850

ATGAACGTGT AAGAGATGAT TATCAATTAC ATTGGACATC AACTAATTGG      900

AAAGGTACAA ATACTAAAGA TAAATGGACA GATAGAAGTT CAGAAAGATA      950

TAAAATTGAT TGGGAAAAAG AAGAAATGAC AAATGGTCTC AGCGCTTGGA     1000

GCCACCCGCA GTTCGAAAAA TAA                                  1023

SEQ ID NO: 2 (WT a-HL amino acids) [as expressed in E. coli]
MADSDINIKT GTTDIGSNTT VKTGDLVTYD KENGMHKKVF YSFIDDKNHN       50

KKLLVIRTKG TIAGQYRVYS EEGANKSGLA WPSAFKVQLQ LPDNEVAQIS      100

DYYPRNSIDT KEYMSTLTYG FNGNVTGDDT GKIGGLIGAN VSIGHTLKYV      150

QPDFKTILES PTDKKVGWKV IFNNMVNQNW GPYDRDSWNP VYGNQLFMKT      200

RNGSMKAADN FLDPNKASSL LSSGFSPDFA TVITMDRKAS KQQTNIDVIY      250

ERVRDDYQLH WTSTNWKGTN TKDKWTDRSS ERYKIDWEKE EMTNGLSAWS      300

HPQFEK                                                     306

SEQ ID NO: 3 (Mature WT aHL, with purification tag)
ADSDINIKTG TTDIGSNTTV KTGDLVTYDK ENGMHKKVFY SFIDDKNHNK       50

KLLVIRTKGT IAGQYRVYSE EGANKSGLAW PSAFKVQLQL PDNEVAQISD      100

YYPRNSIDTK EYMSTLTYGF NGNVTGDDTG KIGGLIGANV SIGHTLKYVQ      150

PDFKTILESP TDKKVGWKVI FNNMVNQNWG PYDRDSWNPV YGNQLFMKTR      200

NGSMKAADNF LDPNKASSLL SSGFSPDFAT VITMDRKASK QQTNIDVIYE      250

RVRDDYQLHW TSTNWKGTNT KDKWTDRSSE RYKIDWEKEE MTNGLSAWSH      300

PQFEK                                                      305

SEQ ID NO: 4 (α-HL-LNKR-SpyTag-HIS-CapTag)
Underlined = flexible linker; bold = SpyTag; italicized =
HistTag; bold/underlined = peptide based nanotag
ADSDINIKTG TTDIGSNTTV KTGDLVTYDK ENGMGKKVFY SFIDDKNHNK       50

KLLVIRTKGT IAGQYRVYSE EGANKSGLAW PSAFKVQLQL PDNEVAQISD      100

YYPRNSIDTK EYMSTLTYGF NGNVTGDDTG KIGGLIGANV SIGHTLKYVQ      150
```

| SEQUENCE LISTING FREE TEXT |
|---|

```
PDFKTILESP TDKKVGWKVI FNNMVNQNWG PYDRDSWNPV YGNQLFMKTR    200

NGSMKAADNF LDPNKASSLL SSGFSPDFAT VITMDRKASK QQTNIDVIYE    250

RVRDDYQLHW TSTNWKGTNT KDKWTDRSSE RYKIDWEKEE MTNGGSSGGS    300

SGGAHIVMVD AYKPTKKGHH HHHHEAAAEA AAEAAAEAAA EAAAEAAAEA    350

AAEAAAEAAA EAAAEAAAEA AAEAAAEEEE E                       381

SEQ ID NO: 5 (α-HL H35G variant, 6 component)
Underlined = TEV-His tag
ADSDINIKTG TTDIGSNTTV KTGDLVTYDK ENGMGKKVFY SFIDDKNHNK     50

KLLVIRTKGT IAGQYRVYSE EGANKSGLAW PSAFKVQLQL PDNEVAQISD    100

YYPRNSIDTK EYMSTLTYGF NGNVTGDDTG KIGGLIGANV SIGATLKYVQ    150

PDFKTILESP TDKKVGWKVI FNNMVNQNWG PYDRDSWNPV YGNQLFMKTR    200

NGSMKAADNF LDPNKASSLL SSGFSPDFAT VITMDRKASK QQTNIDVIYE    250

RVRDDYQLHW TSTNWKGTNT KDKWTDRSSE RYKIDWEKEE MTNGLSAENL    300

YFQGHHHHHH                                               310

SEQ ID NO: 6 (OmpG)
EERNDWHFNI GAMYEIENVE GYGEDMDGLA EPSVYFNAAN GPWRIALAYK     50

QEGPVDYSAG KRGTWFDRPE LEVHYQFLEN DDFSFGLTGG FRNYGYHYVD    100

EPGKDTANMQ RWKIAPDWDV KLTDDLRFNG WLSMYKFAND LNTTGYADTR    150

VETETGLQYT FNETVALRVN YYLERGFNMD DSRNNGEFST QEIRAYLPLT    200

LGNHSVTPYT RIGLRAGHDF NRVGLFYGYD FQNGLSVSLE YAFEWQDHDE    250

GDSDKFHYAG VGVNYSF                                       267

SEQ ID NO: 7 (OmpG-LNKR1-HIS-LNKR2-SpyTag-CapTag)
Underlined = flexible Linker; italicized = HisTag; GSGG (SEQ
ID NO: 14)= second linker; bold/underlined = SpyTag; bold
alone = peptide-based nanotag
EERNDWHFNI GAMYEIENVE GYGEDMDGLA EPSVYFNAAN GPWRIALAYK

QEGPVDYSAG KRGTWFDRPE LEVHYQFLEN DDFSFGLTGG FRNYGYHYVD

EPGKDTANMQ RWKIAPDWDV KLTDDLRFNG WLSMYKFAND LNTTGYADTR

VETETGLQYT FNETVALRVN YYLERGFNMD DSRNNGEFST QEIRAYLPLT

LGNHSVTPYT RIGLRAGHDF NRVGLFYGYD FQNGLSVSLE YAFEWQDHDE

GDSDKFHYAG VGVNYSFEKE KEKGSHHHHH HGSGGAHIVM VDAYKPTKEA

AAEAAAEAAA EAAAEAAAEA AAEAAAEAAA EAAAEAAAEA AAEAAAEAAA

EEEEE

SEQ ID NO: 8 (Capture Tag amino acid sequence)
EAAAEAAAEA AAEAAAEAAA EAAAEAAAEA AAEAAAEAAA EAAAEAAAEA     50
AEEEEE                                                    56

SEQ ID NO: 9 (nanobody, GFP-LNKR-SpyCatcher-TEV/His)
Bold = flexible linker; underlined = TEV-His-Tag
QVQLVESGGA LVQPGGSLRL SCAASGFPVN RYSMRWYRQA PGKEREWVAG     50

MSSAGDRSSY EDSVKGRFTI SRDDARNTVY LQMNSLKPED TAVYYCNVNV    100

GFEYWGQGTQ VTVSSKGSGS GSDSATHIKF SKRDEDGKEL AGATMELRDS    150

SGKTISTWIS DGQVKDFYLY PGKYTFVETA APDGYEVATA ITFTVNEQGQ    200

VTVNGKATKG DAHIENLYFQ GHHHHHHHH                          229
```

SEQUENCE LISTING FREE TEXT

SEQ ID NO: 10 (GFP-LINKER-SpyCatcher-HisTag)
Underlined = Hist-Tag; bold = flexible linker

```
SKGEELFTGV VPILVELDGD VNGHKFSVRG EGEGDATNGK LTLKFICTTG      50
KLPVPWPTLV TTLGYGVQCF SRYPDHMKRH DFFKSAMPEG YVQERTISFK     100
DGTYKTRAEV KFEGDTLVNR IELKGIDFKE DGNILGHKLE YNFNSHNVYI     150
TADKQKNGIK ANFKIRHNVE DGSVQLADHY QQNTPIGDGP VLLPDNHYLS     200
TQSKLSKDPN EKRDHMVLLE FVTAAGITHG MDELYKGSGG SGGSGGSGGS     250
GGAMVDTLSG LSSEQGQSGD MTIEEDSATH IKFSKRDEDG KELAGATMEL    300
RDSSGKTIST VVISDGQVKD FYLYPGKYTF VETAAPDGYE VATAITFTVN     350
EQGQVTVNGK ATKGDAHIHH HHHH                                 374
```

SEQ ID NO: 11 (SpyTag Sequence)
AHIVMVDAYKPTKK

SEQ ID NO: 12 (linker sequence)
GGSSGGSSGG

SEQ ID NO: 13 (linker sequnece)
EKEKEKGS

SEQ ID NO: 14 (linker sequnece)
GSGG

SEQ ID NO: 15 (linker sequnece)
GSGSGS

SEQ ID NO: 16 (Mature WT α-HL; AAA26598)
```
ADSDINIKTG TTDIGSNTTV KTGDLVTYDK ENGMHKKVFY SFIDDKNHNK      50
KLLVIRTKGT IAGQYRVYSE EGANKSGLAW PSAFKVQLQL PDNEVAQISD     100
YYPRNSIDTK EYMSTLTYGF NGNVTGDDTG KIGGLIGANV SIGHTLKYVQ     150
PDFKTILESP TDKKVGWKVI FNNMVNQNWG PYDRDSWNPV YGNQLFMKTR     200
NGSMKAADNF LDPNKASSLL SSGFSPDFAT VITMDRKASK QQTNIDVIYE     250
RVRDDYQLHW TSTNWKGTNT KDKWTDRSSE RYKIDWEKEE MTN            293
```

SEQ ID NO: 17-EPPP Tag
EPPP

---

The invention claimed is:

1. A nanopore protein conjugate comprising a nanopore protein monomer, an analyte attachment domain, and a capture tag, wherein (i) the capture tag comprises an amino acid sequence having at least 95% sequence identity to the amino acid sequence set forth as SEQ ID NO: 8, wherein (ii) the nanopore protein monomer of the nanopore protein conjugate comprises an amino acid sequence having at least 95% sequence identity to the sequence set forth as SEQ ID NO: 16 or SEQ ID NO: 6, and wherein (iii) the analyte attachment domain comprises an amino acid sequence that is located between the nanopore monomer and the capture tag.

2. The nanopore protein conjugate of claim 1, wherein the capture tag comprises an amino acid sequence having at least 98% sequence identity to the sequence set forth as SEQ ID NO: 8.

3. The nanopore protein conjugate of claim 1, wherein the nanopore protein monomer of the nanopore protein conjugate comprises an amino acid sequence having at least 98% sequence identity to the sequence set forth as SEQ ID NO: 16 or at least 98% sequence identity to the sequence set forth as SEQ ID NO: 6.

4. The nanopore protein conjugate of claim 1, wherein the nanopore protein conjugate comprises an amino acid sequence having at least 95% sequence identity to the sequence set forth as SEQ ID NO: 4 or SEQ ID NO: 7.

5. An analyte detection complex, wherein the analyte detection complex comprises a nanopore protein conjugate of claim 1 and an analyte ligand that is joined to the nanopore protein conjugate, wherein the analyte ligand comprises a polypeptide sequence and wherein the analyte ligand is capable of binding a target analyte.

6. The analyte detection complex of claim 5, wherein the analyte ligand comprises an antibody or functional fragment thereof.

7. The analyte detection complex of claim 5, wherein the analyte ligand is joined to the nanopore protein conjugate via an isopeptide linkage.

8. The analyte detection complex of claim 5, wherein the analyte detection complex further comprises a linker member amino acid sequence and an attachment member amino acid sequence, wherein the linker member amino acid sequence attaches the analyte ligand to the attachment member amino acid sequence, wherein the attachment member amino acid sequence is joined to the nanopore protein complex at the analyte attachment domain of the nanopore protein conjugate, and wherein the linker member amino acid sequence and the attachment member amino acid sequence comprise a SpyCatcher/SpyTag binding pair of amino acid sequences, with the SpyTag sequence having at least 85% sequence identity to the amino acid sequence set forth as SEQ ID NO: 11.

9. A nanopore assembly comprising at least one analyte detection complex of claim 5.

10. The nanopore assembly of claim 9, wherein the nanopore assembly is a heptameric nanopore assembly and wherein each monomer of the heptameric nanopore assembly comprises an alpha-hemolysin monomer.

11. A system for determining the concentration of analyte in a fluid solution, comprising:
  a chip comprising a nanopore assembly, wherein the nanopore assembly is disposed within a membrane of the chip and wherein at least one nanopore protein monomer of the nanopore assembly comprises a capture tag and an analyte ligand, wherein the analyte ligand comprises a polypeptide sequence and wherein the analyte ligand is capable of binding a target analyte;
  a sensing electrode positioned adjacent to or in proximity to the membrane, wherein the sensing electrode is configured to detect a signal from the nanopore assembly; and,
  a computer processor, wherein the computer processor and sensing electrodes are configured to identify a first transition and a second transition associated with the nanopore assembly, the first transition corresponding to binding of the target analyte to the analyte ligand and the second transition corresponding to dissociation of the target analyte from the analyte ligand,
  wherein the capture tag comprises an amino acid sequence having at least 95% sequence identity to the amino acid sequence set forth as SEQ ID NO: 8 and wherein the nanopore protein monomer comprises an amino acid sequence having at least 95% sequence identity to the sequence set forth as SEQ ID NO: 16 or SEQ ID NO: 6.

12. The system of claim 11, wherein a concentration of the target analyte in the fluid solution is determined based at least in part on the identified first transition and the identified second transition.

13. The system of claim 11, wherein the nanopore protein monomer is an alpha-hemolysin monomer.

14. The system of claim 11, wherein the nanopore protein conjugate comprises an amino acid sequence having at least 95% sequence identity to the sequence set forth as SEQ ID NO: 4 or SEQ ID NO: 7.

15. The system of claim 11, wherein the capture tag comprises an amino acid sequence having at least 98% sequence identity to the sequence set forth as SEQ ID NO: 8.

* * * * *

SEQUENCE LISTING

<160> NUMBER OF SEQ ID NOS: 17

<210> SEQ ID NO 1
<211> LENGTH: 1023
<212> TYPE: DNA
<213> ORGANISM: Staphylococcus aureus

<400> SEQUENCE: 1

```
atggcagatc tcgatcccgc gaaattaata cgactcacta tagggaggcc acaacggttt      60
ccctctagaa ataattttgt ttaactttaa gaaggagata tacaaatgga ttcagatatt     120
aatattaaaa caggtacaac agatattggt tcaaatacaa cagtaaaaac tggtgattta     180
gtaacttatg ataaagaaaa tggtatgcat aaaaaagtat tttattcttt tattgatgat     240
aaaaatcata ataaaaaatt gttagttatt cgtacaaaag gtactattgc aggtcaatat     300
agagtatata gtgaagaagg tgctaataaa agtggtttag catggccatc tgcttttaaa     360
```

```
gttcaattac aattacctga taatgaagta gcacaaattt cagattatta tccacgtaat    420
agtattgata caaaagaata tatgtcaaca ttaacttatg gttttaatgg taatgtaaca    480
ggtgatgata ctggtaaaat tggtggttta attggtgcta atgtttcaat tggtcataca    540
ttaaaatatg tacaaccaga ttttaaaaca attttagaaa gtcctactga taaaaaagtt    600
ggttggaaag taatttttaa taatatggtt aatcaaaatt ggggtcctta tgatcgtgat    660
agttggaatc ctgtatatgg taatcaatta tttatgaaaa caagaaatgg ttctatgaaa    720
gcagctgata atttcttaga tccaaataaa gcatcaagtt tattatcttc aggttttttct   780 cctgattttg caacagttat tactatggat agaaaagcat caaacaaca aacaaatatt     840 gatgttattt atgaacgtgt aagagatgat tatcaattac attggacatc aactaattgg    900
aaaggtacaa atactaaaga taatggaca gatagaagtt cagaaagata taaaattgat     960
tgggaaaaag aagaaatgac aaatggtctc agcgcttgga gccacccgca gttcgaaaaa    1020
taa                                                                  1023
```

<210> SEQ ID NO 2
<211> LENGTH: 306
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 2

```
Met Ala Asp Ser Asp Ile Asn Ile Lys Thr Gly Thr Thr Asp Ile Gly
1               5                   10                  15

Ser Asn Thr Thr Val Lys Thr Gly Asp Leu Val Thr Tyr Asp Lys Glu
            20                  25                  30

Asn Gly Met His Lys Lys Val Phe Tyr Ser Phe Ile Asp Asp Lys Asn
        35                  40                  45

His Asn Lys Lys Leu Leu Val Ile Arg Thr Lys Gly Thr Ile Ala Gly
    50                  55                  60

Gln Tyr Arg Val Tyr Ser Glu Glu Gly Ala Asn Lys Ser Gly Leu Ala
65                  70                  75                  80

Trp Pro Ser Ala Phe Lys Val Gln Leu Gln Leu Pro Asp Asn Glu Val
                85                  90                  95

Ala Gln Ile Ser Asp Tyr Tyr Pro Arg Asn Ser Ile Asp Thr Lys Glu
            100                 105                 110

Tyr Met Ser Thr Leu Thr Tyr Gly Phe Asn Gly Asn Val Thr Gly Asp
        115                 120                 125

Asp Thr Gly Lys Ile Gly Gly Leu Ile Gly Ala Asn Val Ser Ile Gly
    130                 135                 140

His Thr Leu Lys Tyr Val Gln Pro Asp Phe Lys Thr Ile Leu Glu Ser
145                 150                 155                 160

Pro Thr Asp Lys Lys Val Gly Trp Lys Val Ile Phe Asn Asn Met Val
                165                 170                 175

Asn Gln Asn Trp Gly Pro Tyr Arg Asp Ser Trp Asn Pro Val Tyr
            180                 185                 190

Gly Asn Gln Leu Phe Met Lys Thr Arg Asn Gly Ser Met Lys Ala Ala
        195                 200                 205

Asp Asn Phe Leu Asp Pro Asn Lys Ala Ser Ser Leu Leu Ser Ser Gly
    210                 215                 220
```

```
Phe Ser Pro Asp Phe Ala Thr Val Ile Thr Met Asp Arg Lys Ala Ser
225                 230                 235                 240

Lys Gln Gln Thr Asn Ile Asp Val Ile Tyr Glu Arg Val Arg Asp Asp
            245                 250                 255

Tyr Gln Leu His Trp Thr Ser Thr Asn Trp Lys Gly Thr Asn Thr Lys
        260                 265                 270

Asp Lys Trp Thr Asp Arg Ser Glu Arg Tyr Lys Ile Asp Trp Glu
        275                 280                 285

Lys Glu Glu Met Thr Asn Gly Leu Ser Ala Trp Ser His Pro Gln Phe
    290                 295                 300

Glu Lys
305

<210> SEQ ID NO 3
<211> LENGTH: 305
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 3

Ala Asp Ser Asp Ile Asn Ile Lys Thr Gly Thr Thr Asp Ile Gly Ser
1               5                   10                  15

Asn Thr Thr Val Lys Thr Gly Asp Leu Val Thr Tyr Asp Lys Glu Asn
            20                  25                  30

Gly Met His Lys Lys Val Phe Tyr Ser Phe Ile Asp Lys Asn His
        35                  40                  45

Asn Lys Lys Leu Leu Val Ile Arg Thr Lys Gly Thr Ile Ala Gly Gln
    50                  55                  60

Tyr Arg Val Tyr Ser Glu Glu Gly Ala Asn Lys Ser Gly Leu Ala Trp
65                  70                  75                  80

Pro Ser Ala Phe Lys Val Gln Leu Gln Leu Pro Asp Asn Glu Val Ala
                85                  90                  95

Gln Ile Ser Asp Tyr Tyr Pro Arg Asn Ser Ile Asp Thr Lys Glu Tyr
            100                 105                 110

Met Ser Thr Leu Thr Tyr Gly Phe Asn Gly Asn Val Thr Gly Asp Asp
        115                 120                 125

Thr Gly Lys Ile Gly Gly Leu Ile Gly Ala Asn Val Ser Ile Gly His
    130                 135                 140

Thr Leu Lys Tyr Val Gln Pro Asp Phe Lys Thr Ile Leu Glu Ser Pro
145                 150                 155                 160

Thr Asp Lys Lys Val Gly Trp Lys Val Ile Phe Asn Asn Met Val Asn
                165                 170                 175

Gln Asn Trp Gly Pro Tyr Asp Arg Asp Ser Trp Asn Pro Val Tyr Gly
            180                 185                 190

Asn Gln Leu Phe Met Lys Thr Arg Asn Gly Ser Met Lys Ala Ala Asp
        195                 200                 205

Asn Phe Leu Asp Pro Asn Lys Ala Ser Ser Leu Leu Ser Ser Gly Phe
    210                 215                 220

Ser Pro Asp Phe Ala Thr Val Ile Thr Met Asp Arg Lys Ala Ser Lys
225                 230                 235                 240

Gln Gln Thr Asn Ile Asp Val Ile Tyr Glu Arg Val Arg Asp Asp Tyr
                245                 250                 255
```

Gln Leu His Trp Thr Ser Thr Asn Trp Lys Gly Thr Asn Thr Lys Asp
            260                 265                 270

Lys Trp Thr Asp Arg Ser Ser Glu Arg Tyr Lys Ile Asp Trp Glu Lys
            275                 280                 285

Glu Glu Met Thr Asn Gly Leu Ser Ala Trp Ser His Pro Gln Phe Glu
            290                 295                 300

Lys
305

<210> SEQ ID NO 4
<211> LENGTH: 381
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 4

Ala Asp Ser Asp Ile Asn Ile Lys Thr Gly Thr Thr Asp Ile Gly Ser
1               5                   10                  15

Asn Thr Thr Val Lys Thr Gly Asp Leu Val Thr Tyr Asp Lys Glu Asn
            20                  25                  30

Gly Met Gly Lys Lys Val Phe Tyr Ser Phe Ile Asp Asp Lys Asn His
        35                  40                  45

Asn Lys Lys Leu Leu Val Ile Arg Thr Lys Gly Thr Ile Ala Gly Gln
    50                  55                  60

Tyr Arg Val Tyr Ser Glu Glu Gly Ala Asn Lys Ser Gly Leu Ala Trp
65                  70                  75                  80

Pro Ser Ala Phe Lys Val Gln Leu Gln Leu Pro Asp Asn Glu Val Ala
                85                  90                  95

Gln Ile Ser Asp Tyr Tyr Pro Arg Asn Ser Ile Asp Thr Lys Glu Tyr
            100                 105                 110

Met Ser Thr Leu Thr Tyr Gly Phe Asn Gly Asn Val Thr Gly Asp Asp
        115                 120                 125

Thr Gly Lys Ile Gly Gly Leu Ile Gly Ala Asn Val Ser Ile Gly His
    130                 135                 140

Thr Leu Lys Tyr Val Gln Pro Asp Phe Lys Thr Ile Leu Glu Ser Pro
145                 150                 155                 160

Thr Asp Lys Lys Val Gly Trp Lys Val Ile Phe Asn Asn Met Val Asn
                165                 170                 175

Gln Asn Trp Gly Pro Tyr Asp Arg Asp Ser Trp Asn Pro Val Tyr Gly
            180                 185                 190

Asn Gln Leu Phe Met Lys Thr Arg Asn Gly Ser Met Lys Ala Ala Asp
        195                 200                 205

Asn Phe Leu Asp Pro Asn Lys Ala Ser Ser Leu Leu Ser Ser Gly Phe
    210                 215                 220

Ser Pro Asp Phe Ala Thr Val Ile Thr Met Asp Arg Lys Ala Ser Lys
225                 230                 235                 240

Gln Gln Thr Asn Ile Asp Val Ile Tyr Glu Arg Val Arg Asp Asp Tyr
                245                 250                 255

Gln Leu His Trp Thr Ser Thr Asn Trp Lys Gly Thr Asn Thr Lys Asp
            260                 265                 270

Lys Trp Thr Asp Arg Ser Ser Glu Arg Tyr Lys Ile Asp Trp Glu Lys
            275                 280                 285

```
Glu Met Thr Asn Gly Gly Ser Ser Gly Gly Ser Ser Gly Gly Ala
    290             295             300

His Ile Val Met Val Asp Ala Tyr Lys Pro Thr Lys Lys Gly His His
305             310             315             320

His His His His Glu Ala Ala Ala Glu Ala Ala Ala Glu Ala Ala Ala
                325             330             335

Glu Ala Ala Ala Glu Ala Ala Ala Glu Ala Ala Ala Glu Ala Ala Ala
        340             345             350

Glu Ala Ala Ala Glu Ala Ala Ala Glu Ala Ala Ala Glu Ala Ala Ala
        355             360             365

Glu Ala Ala Ala Glu Ala Ala Ala Glu Glu Glu Glu Glu
        370             375             380

<210> SEQ ID NO 5
<211> LENGTH: 310
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 5

Ala Asp Ser Asp Ile Asn Ile Lys Thr Gly Thr Thr Asp Ile Gly Ser
1               5                   10                  15

Asn Thr Thr Val Lys Thr Gly Asp Leu Val Thr Tyr Asp Lys Glu Asn
            20                  25                  30

Gly Met Gly Lys Lys Val Phe Tyr Ser Phe Ile Asp Lys Asn His
            35                  40                  45

Asn Lys Lys Leu Leu Val Ile Arg Thr Lys Gly Thr Ile Ala Gly Gln
    50                  55                  60

Tyr Arg Val Tyr Ser Glu Glu Gly Ala Asn Lys Ser Gly Leu Ala Trp
65                  70                  75                  80

Pro Ser Ala Phe Lys Val Gln Leu Gln Leu Pro Asp Asn Glu Val Ala
                85                  90                  95

Gln Ile Ser Asp Tyr Tyr Pro Arg Asn Ser Ile Asp Thr Lys Glu Tyr
            100                 105                 110

Met Ser Thr Leu Thr Tyr Gly Phe Asn Gly Asn Val Thr Gly Asp Asp
        115                 120                 125

Thr Gly Lys Ile Gly Gly Leu Ile Gly Ala Asn Val Ser Ile Gly Ala
    130                 135                 140

Thr Leu Lys Tyr Val Gln Pro Asp Phe Lys Thr Ile Leu Glu Ser Pro
145                 150                 155                 160

Thr Asp Lys Lys Val Gly Trp Lys Val Ile Phe Asn Asn Met Val Asn
                165                 170                 175

Gln Asn Trp Gly Pro Tyr Asp Arg Asp Ser Trp Asn Pro Val Tyr Gly
            180                 185                 190

Asn Gln Leu Phe Met Lys Thr Arg Asn Gly Ser Met Lys Ala Ala Asp
        195                 200                 205

Asn Phe Leu Asp Pro Asn Lys Ala Ser Ser Leu Leu Ser Ser Gly Phe
    210                 215                 220

Ser Pro Asp Phe Ala Thr Val Ile Thr Met Asp Arg Lys Ala Ser Lys
225                 230                 235                 240

Gln Gln Thr Asn Ile Asp Val Ile Tyr Glu Arg Val Arg Asp Asp Tyr
                245                 250                 255
```

-continued

Gln Leu His Trp Thr Ser Thr Asn Trp Lys Gly Thr Asn Thr Lys Asp
                260                 265                 270

Lys Trp Thr Asp Arg Ser Ser Glu Arg Tyr Lys Ile Asp Trp Glu Lys
            275                 280                 285

Glu Glu Met Thr Asn Gly Leu Ser Ala Glu Asn Leu Tyr Phe Gln Gly
        290                 295                 300

His His His His His His
305                 310

<210> SEQ ID NO 6
<211> LENGTH: 267
<212> TYPE: PRT
<213> ORGANISM: Unknown
<220> FEATURE:
<221> NAME/KEY: source
<223> OTHER INFORMATION: /note="Description of Unknown:
    OmpG sequence"

<400> SEQUENCE: 6

Glu Glu Arg Asn Asp Trp His Phe Asn Ile Gly Ala Met Tyr Glu Ile
1               5                   10                  15

Glu Asn Val Glu Gly Tyr Gly Glu Asp Met Asp Gly Leu Ala Glu Pro
            20                  25                  30

Ser Val Tyr Phe Asn Ala Ala Asn Gly Pro Trp Arg Ile Ala Leu Ala
        35                  40                  45

Tyr Lys Gln Glu Gly Pro Val Asp Tyr Ser Ala Gly Lys Arg Gly Thr
    50                  55                  60

Trp Phe Asp Arg Pro Glu Leu Glu Val His Tyr Gln Phe Leu Glu Asn
65                  70                  75                  80

Asp Asp Phe Ser Phe Gly Leu Thr Gly Gly Phe Arg Asn Tyr Gly Tyr
                85                  90                  95

His Tyr Val Asp Glu Pro Gly Lys Asp Thr Ala Asn Met Gln Arg Trp
            100                 105                 110

Lys Ile Ala Pro Asp Trp Asp Val Lys Leu Thr Asp Leu Arg Phe
        115                 120                 125

Asn Gly Trp Leu Ser Met Tyr Lys Phe Ala Asn Asp Leu Asn Thr Thr
130                 135                 140

Gly Tyr Ala Asp Thr Arg Val Glu Thr Glu Thr Gly Leu Gln Tyr Thr
145                 150                 155                 160

Phe Asn Glu Thr Val Ala Leu Arg Val Asn Tyr Tyr Leu Glu Arg Gly
                165                 170                 175

Phe Asn Met Asp Asp Ser Arg Asn Asn Gly Glu Phe Ser Thr Gln Glu
            180                 185                 190

Ile Arg Ala Tyr Leu Pro Leu Thr Leu Gly Asn His Ser Val Thr Pro
        195                 200                 205

Tyr Thr Arg Ile Gly Leu Arg Ala Gly His Asp Phe Asn Arg Val Gly
    210                 215                 220

Leu Phe Tyr Gly Tyr Asp Phe Gln Asn Gly Leu Ser Val Ser Leu Glu
225                 230                 235                 240

Tyr Ala Phe Glu Trp Gln Asp His Asp Glu Gly Asp Ser Asp Lys Phe
                245                 250                 255

His Tyr Ala Gly Val Gly Val Asn Tyr Ser Phe
            260                 265

<210> SEQ ID NO 7
<211> LENGTH: 355
<212> TYPE: PRT

<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 7

```
Glu Glu Arg Asn Asp Trp His Phe Asn Ile Gly Ala Met Tyr Glu Ile
1               5                   10                  15
Glu Asn Val Glu Gly Tyr Gly Glu Asp Met Asp Gly Leu Ala Glu Pro
            20                  25                  30
Ser Val Tyr Phe Asn Ala Ala Asn Gly Pro Trp Arg Ile Ala Leu Ala
        35                  40                  45
Tyr Lys Gln Glu Gly Pro Val Asp Tyr Ser Ala Gly Lys Arg Gly Thr
50                  55                  60
Trp Phe Asp Arg Pro Glu Leu Glu Val His Tyr Gln Phe Leu Glu Asn
65                  70                  75                  80
Asp Asp Phe Ser Phe Gly Leu Thr Gly Gly Phe Arg Asn Tyr Gly Tyr
                85                  90                  95
His Tyr Val Asp Glu Pro Gly Lys Asp Thr Ala Asn Met Gln Arg Trp
            100                 105                 110
Lys Ile Ala Pro Asp Trp Asp Val Lys Leu Thr Asp Leu Arg Phe
        115                 120                 125
Asn Gly Trp Leu Ser Met Tyr Lys Phe Ala Asn Asp Leu Asn Thr Thr
130                 135                 140
Gly Tyr Ala Asp Thr Arg Val Glu Thr Glu Thr Gly Leu Gln Tyr Thr
145                 150                 155                 160
Phe Asn Glu Thr Val Ala Leu Arg Val Asn Tyr Tyr Leu Glu Arg Gly
                165                 170                 175
Phe Asn Met Asp Asp Ser Arg Asn Asn Gly Glu Phe Ser Thr Gln Glu
            180                 185                 190
Ile Arg Ala Tyr Leu Pro Leu Thr Leu Gly Asn His Ser Val Thr Pro
        195                 200                 205
Tyr Thr Arg Ile Gly Leu Arg Ala Gly His Asp Phe Asn Arg Val Gly
210                 215                 220
Leu Phe Tyr Gly Tyr Asp Phe Gln Asn Gly Leu Ser Val Ser Leu Glu
225                 230                 235                 240
Tyr Ala Phe Glu Trp Gln Asp His Asp Glu Gly Asp Ser Asp Lys Phe
                245                 250                 255
His Tyr Ala Gly Val Gly Val Asn Tyr Ser Phe Glu Lys Glu Lys Glu
            260                 265                 270
Lys Gly Ser His His His His His His Gly Ser Gly Gly Ala His Ile
        275                 280                 285
Val Met Val Asp Ala Tyr Lys Pro Thr Lys Glu Ala Ala Ala Glu Ala
290                 295                 300
Ala Ala Glu Ala Ala Ala Glu Ala Ala Ala Glu Ala Ala Ala Glu Ala
305                 310                 315                 320
Ala Ala Glu Ala Ala Ala Glu Ala Ala Ala Glu Ala Ala Ala Glu Ala
                325                 330                 335
Ala Ala Glu Ala Ala Ala Glu Ala Ala Ala Glu Ala Ala Ala Glu Glu
            340                 345                 350
Glu Glu Glu
        355
```

<210> SEQ ID NO 8

```
<211> LENGTH: 57
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 8

Glu Ala Ala Ala Glu Ala Ala Ala Glu Ala Ala Ala Glu Ala Ala Ala
1               5                   10                  15

Glu Ala Ala Ala Glu Ala Ala Ala Glu Ala Ala Ala Glu Ala Ala Ala
            20                  25                  30

Glu Ala Ala Ala Glu Ala Ala Ala Glu Ala Ala Ala Glu Ala Ala Ala
        35                  40                  45

Glu Ala Ala Ala Glu Glu Glu Glu Glu
    50                  55

<210> SEQ ID NO 9
<211> LENGTH: 229
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 9

Gln Val Gln Leu Val Glu Ser Gly Gly Ala Leu Val Gln Pro Gly Gly
1               5                   10                  15

Ser Leu Arg Leu Ser Cys Ala Ala Ser Gly Phe Pro Val Asn Arg Tyr
            20                  25                  30

Ser Met Arg Trp Tyr Arg Gln Ala Pro Gly Lys Glu Arg Glu Trp Val
        35                  40                  45

Ala Gly Met Ser Ser Ala Gly Asp Arg Ser Ser Tyr Glu Asp Ser Val
    50                  55                  60

Lys Gly Arg Phe Thr Ile Ser Arg Asp Asp Ala Arg Asn Thr Val Tyr
65                  70                  75                  80

Leu Gln Met Asn Ser Leu Lys Pro Glu Asp Thr Ala Val Tyr Tyr Cys
                85                  90                  95

Asn Val Asn Val Gly Phe Glu Tyr Trp Gly Gln Gly Thr Gln Val Thr
            100                 105                 110

Val Ser Ser Lys Gly Ser Gly Ser Gly Ser Asp Ser Ala Thr His Ile
        115                 120                 125

Lys Phe Ser Lys Arg Asp Glu Asp Gly Lys Glu Leu Ala Gly Ala Thr
    130                 135                 140

Met Glu Leu Arg Asp Ser Ser Gly Lys Thr Ile Ser Thr Trp Ile Ser
145                 150                 155                 160

Asp Gly Gln Val Lys Asp Phe Tyr Leu Tyr Pro Gly Lys Tyr Thr Phe
                165                 170                 175

Val Glu Thr Ala Ala Pro Asp Gly Tyr Glu Val Ala Thr Ala Ile Thr
            180                 185                 190

Phe Thr Val Asn Glu Gln Gly Gln Val Thr Val Asn Gly Lys Ala Thr
        195                 200                 205

Lys Gly Asp Ala His Ile Glu Asn Leu Tyr Phe Gln Gly His His His
    210                 215                 220

His His His His His
225
```

<210> SEQ ID NO 10
<211> LENGTH: 373
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 10

```
Ser Lys Gly Glu Glu Leu Phe Thr Gly Val Val Pro Ile Leu Val Glu
1               5                   10                  15

Leu Asp Gly Asp Val Asn Gly His Lys Phe Ser Val Arg Gly Glu Gly
            20                  25                  30

Glu Gly Asp Ala Thr Asn Gly Lys Leu Thr Leu Lys Phe Ile Cys Thr
        35                  40                  45

Thr Gly Lys Leu Pro Val Pro Trp Pro Thr Leu Val Thr Thr Leu Gly
    50                  55                  60

Tyr Gly Val Gln Cys Phe Ser Arg Tyr Pro Asp His Met Lys Arg His
65                  70                  75                  80

Asp Phe Phe Lys Ser Ala Met Pro Glu Gly Tyr Val Gln Glu Arg Thr
                85                  90                  95

Ile Ser Phe Lys Asp Gly Thr Tyr Lys Thr Arg Ala Glu Val Lys Phe
            100                 105                 110

Glu Gly Asp Thr Leu Val Asn Arg Ile Glu Leu Lys Gly Ile Asp Phe
        115                 120                 125

Lys Glu Asp Gly Asn Ile Leu Gly His Lys Leu Glu Tyr Asn Phe Asn
    130                 135                 140

Ser His Asn Val Tyr Ile Thr Ala Asp Lys Gln Lys Asn Gly Ile Lys
145                 150                 155                 160

Ala Asn Phe Lys Ile Arg His Asn Val Glu Asp Gly Ser Val Gln Leu
                165                 170                 175

Ala Asp His Tyr Gln Gln Asn Thr Pro Ile Gly Asp Gly Pro Val Leu
            180                 185                 190

Leu Pro Asp Asn His Tyr Leu Ser Thr Gln Ser Lys Leu Ser Lys Asp
        195                 200                 205

Pro Asn Glu Lys Arg Asp His Met Val Leu Leu Glu Phe Val Thr Ala
    210                 215                 220

Ala Gly Ile Thr His Gly Met Asp Glu Leu Tyr Lys Ser Gly Gly
225                 230                 235                 240

Ser Gly Gly Ser Gly Gly Ser Gly Gly Ser Gly Gly Ala Met Val Asp
                245                 250                 255

Thr Leu Ser Gly Leu Ser Ser Glu Gln Gly Gln Ser Gly Asp Met Thr
            260                 265                 270

Ile Glu Glu Asp Ser Ala Thr His Ile Lys Phe Ser Lys Arg Asp Glu
        275                 280                 285

Asp Gly Lys Glu Leu Ala Gly Ala Thr Met Glu Leu Arg Asp Ser Ser
    290                 295                 300

Gly Lys Thr Ile Ser Thr Trp Ile Ser Asp Gly Gln Val Lys Asp Phe
305                 310                 315                 320

Tyr Leu Tyr Pro Gly Lys Tyr Thr Phe Val Glu Thr Ala Ala Pro Asp
                325                 330                 335

Gly Tyr Glu Val Ala Thr Ala Ile Thr Phe Thr Val Asn Glu Gln Gly
            340                 345                 350
```

```
Gln Val Thr Val Asn Gly Lys Ala Thr Lys Gly Asp Ala His Ile His
        355                 360                 365

His His His His
    370

<210> SEQ ID NO 11
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 11

Ala His Ile Val Met Val Asp Ala Tyr Lys Pro Thr Lys Lys
1               5                   10

<210> SEQ ID NO 12
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 12

Gly Gly Ser Ser Gly Gly Ser Ser Gly Gly
1               5                   10

<210> SEQ ID NO 13
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 13

Glu Lys Glu Lys Glu Lys Gly Ser
1               5

<210> SEQ ID NO 14
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 14

Gly Ser Gly Gly
1

<210> SEQ ID NO 15
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
```

<400> SEQUENCE: 15

Gly Ser Gly Ser Gly Ser
1               5

<210> SEQ ID NO 16
<211> LENGTH: 293
<212> TYPE: PRT
<213> ORGANISM: Staphylococcus aureus

<400> SEQUENCE: 16

Ala Asp Ser Asp Ile Asn Ile Lys Thr Gly Thr Thr Asp Ile Gly Ser
1               5                   10                  15

Asn Thr Thr Val Lys Thr Gly Asp Leu Val Thr Tyr Asp Lys Glu Asn
            20                  25                  30

Gly Met His Lys Lys Val Phe Tyr Ser Phe Ile Asp Asp Lys Asn His
        35                  40                  45

Asn Lys Lys Leu Leu Val Ile Arg Thr Lys Gly Thr Ile Ala Gly Gln
    50                  55                  60

Tyr Arg Val Tyr Ser Glu Glu Gly Ala Asn Lys Ser Gly Leu Ala Trp
65                  70                  75                  80

Pro Ser Ala Phe Lys Val Gln Leu Gln Leu Pro Asp Asn Glu Val Ala
                85                  90                  95

Gln Ile Ser Asp Tyr Tyr Pro Arg Asn Ser Ile Asp Thr Lys Glu Tyr
            100                 105                 110

Met Ser Thr Leu Thr Tyr Gly Phe Asn Gly Asn Val Thr Gly Asp Asp
        115                 120                 125

Thr Gly Lys Ile Gly Gly Leu Ile Gly Ala Asn Val Ser Ile Gly His
    130                 135                 140

Thr Leu Lys Tyr Val Gln Pro Asp Phe Lys Thr Ile Leu Glu Ser Pro
145                 150                 155                 160

Thr Asp Lys Lys Val Gly Trp Lys Val Ile Phe Asn Asn Met Val Asn
                165                 170                 175

Gln Asn Trp Gly Pro Tyr Asp Arg Asp Ser Trp Asn Pro Val Tyr Gly
            180                 185                 190

Asn Gln Leu Phe Met Lys Thr Arg Asn Gly Ser Met Lys Ala Ala Asp
        195                 200                 205

Asn Phe Leu Asp Pro Asn Lys Ala Ser Ser Leu Leu Ser Ser Gly Phe
    210                 215                 220

Ser Pro Asp Phe Ala Thr Val Ile Thr Met Asp Arg Lys Ala Ser Lys
225                 230                 235                 240

Gln Gln Thr Asn Ile Asp Val Ile Tyr Glu Arg Val Arg Asp Asp Tyr
                245                 250                 255

Gln Leu His Trp Thr Ser Thr Asn Trp Lys Gly Thr Asn Thr Lys Asp
            260                 265                 270

Lys Trp Thr Asp Arg Ser Ser Glu Arg Tyr Lys Ile Asp Trp Glu Lys
        275                 280                 285

Glu Glu Met Thr Asn
    290

<210> SEQ ID NO 17
<211> LENGTH: 4
<212> TYPE: PRT
<213> ORGANISM: Artificial Sequence
<220> FEATURE:
<221> NAME/KEY: source

```
<223> OTHER INFORMATION: /note="Description of Artificial Sequence:
      Synthetic peptide"

<400> SEQUENCE: 17

Glu Pro Pro Pro
1
```